US010627849B1

(12) United States Patent
Scofield et al.

(10) Patent No.: US 10,627,849 B1
(45) Date of Patent: Apr. 21, 2020

(54) RESERVOIR COMPUTING OPERATIONS USING MULTI-MODE PHOTONIC INTEGRATED CIRCUITS

(71) Applicant: The Aerospace Corporation, El Segundo, CA (US)

(72) Inventors: Adam C. Scofield, Los Angeles, CA (US); Thomas Justin Shaw, Reston, VA (US); George C. Valley, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 25 days.

(21) Appl. No.: 16/154,584

(22) Filed: Oct. 8, 2018

(51) Int. Cl.
| G06E 1/04 | (2006.01) |
| G06F 17/12 | (2006.01) |
| G06N 3/067 | (2006.01) |
| G02F 7/00 | (2006.01) |
| G06F 17/16 | (2006.01) |
| G06E 3/00 | (2006.01) |
| G02B 6/10 | (2006.01) |

(52) U.S. Cl.
CPC ............... *G06E 1/045* (2013.01); *G02B 6/10* (2013.01); *G02F 7/00* (2013.01); *G06E 3/005* (2013.01); *G06E 3/008* (2013.01); *G06F 17/12* (2013.01); *G06F 17/16* (2013.01); *G06N 3/0675* (2013.01)

(58) Field of Classification Search
CPC .......... G06N 3/06; G06N 3/063; G06N 3/067; G06N 3/0675; G06N 10/00; G06N 20/00; G02B 6/10; G02B 6/12; G06F 17/12; G06F 17/16; G06E 3/005; G06E 3/008
See application file for complete search history.

(56) References Cited

U.S. PATENT DOCUMENTS

| 2,747,038 A | 5/1956 | Perkovich |
| 4,851,840 A | 7/1989 | McAulay |
| 5,488,354 A | 1/1996 | Bobby |
| 5,568,127 A | 10/1996 | Bang |
| 6,236,862 B1 | 5/2001 | Erten et al. |
| 6,326,910 B1 | 12/2001 | Hayduk et al. |
| 6,346,124 B1 | 2/2002 | Geiser et al. |
| 6,404,366 B1 | 6/2002 | Clark et al. |
| 6,445,487 B1 | 9/2002 | Roddy et al. |

(Continued)

OTHER PUBLICATIONS

George A. Sefler, T. Justin Shaw, Andrew D. Stapleton, George C. Valley, "Calibration of a speckle-based compressive sensing receiver," Proc. SPIE 10103, Terahertz, RF, Millimeter, and Submillimeter-Wave Technology and Applications X, 101030Z (Feb. 24, 2017) (Year: 2017).*

(Continued)

*Primary Examiner* — Matthew D Sandifer
(74) *Attorney, Agent, or Firm* — Jones Day

(57) ABSTRACT

Under one aspect, a method for performing an operation is provided. The method can include receiving, by different physical locations of a multi-mode waveguide, an input signal and a plurality of coefficients imposed on laser light. The method also can include generating, by the multi-mode waveguide, a speckle pattern based on the different physical locations, the input signal, and the plurality of coefficients. The method also can include adjusting at least one of the coefficients based on the speckle pattern.

22 Claims, 14 Drawing Sheets

(13 of 14 Drawing Sheet(s) Filed in Color)

(56) References Cited

U.S. PATENT DOCUMENTS

| | | | |
|---|---|---|---|
| 6,724,334 B2 | 4/2004 | Tzelnick |
| 6,801,147 B2 | 10/2004 | Thylen et al. |
| 7,321,731 B2 | 1/2008 | Ionov et al. |
| 7,536,431 B2 | 5/2009 | Goren et al. |
| 7,834,795 B1 | 11/2010 | Dudgeon et al. |
| 8,026,837 B1 | 9/2011 | Valley et al. |
| 8,260,442 B2 | 9/2012 | Christensen et al. |
| 8,902,069 B2 | 12/2014 | Valley et al. |
| 9,413,372 B1 | 8/2016 | Valley et al. |
| 2002/0114057 A1 | 8/2002 | Roddy et al. |
| 2002/0126981 A1 | 9/2002 | Roddy et al. |
| 2002/0154375 A1 | 10/2002 | Roddy et al. |
| 2008/0015440 A1 | 1/2008 | Shandas et al. |
| 2008/0062028 A1 | 3/2008 | Chang |
| 2009/0121882 A1 | 5/2009 | Al-Mutairi |
| 2010/0201345 A1 | 8/2010 | Gupta et al. |
| 2010/0241378 A1 | 9/2010 | Baraniuk et al. |
| 2011/0234436 A1 | 9/2011 | Bogoni et al. |
| 2014/0240163 A1 | 8/2014 | Boufounos |
| 2014/0266826 A1 | 9/2014 | Valley et al. |
| 2015/0036021 A1 | 2/2015 | Gigan et al. |
| 2018/0165248 A1 | 6/2018 | Valley et al. |

OTHER PUBLICATIONS

Adam C. Scofield, George A. Sefler, T. Justin Shaw, George C. Valley, "Recent results using laser speckle in multimode waveguides for random projections," Proc. SPIE 10937, Optical Data Science II, 109370B (Mar. 1, 2019) Year: 2019).*
Xiao et al., "Programmable Photonic Microwave Filters With Arbitrary Ultra-Wideband Phase Response," IEEE Trans. Microwave Theory and Technique 54(11):4002-4008 (2006).
Yin et al., "Multifrequency radio frequency sensing with photonics-assisted spectrum compression," Opt. Lett. 38(21):4386-4388 (2013).
USPTO Non-Final Office Action for U.S. Appl. No. 13/830,826, dated May 1, 2014 (7 pages).
USPTO Notice of Allowance for U.S. Appl. No. 12/765,721, dated May 31, 2011 (7 pages).
USPTO Notice of Allowance for U.S. Appl. No. 13/830,826, dated Aug. 21, 2014 (5 pages).
Akulova et al., "10 Gb/s Mach-Zender modulator integrated with widely-tunable sampled grating DBR Laser," Proc. OFC 2004, paper No. TuE4, Los Angeles, CA: 3 pages (2004).
Beck et al., "A fast iterative shrinking-thresholding algorithm for linear inverse problems," SIAM Journal on Imaging Sciences 2(1): 183-202 (2009).
Bortnik et al., "Predistortion technique for RF-photonic generation of high-power ultrawideband arbitrary waveforms," J. Lightwave Technology 24(7):2752-2759 (2006).
Bosworth et al., "High-speed ultrawideband compressed sensing of sparse radio frequency signals," CLEO: 2014, OSA Technical Digest (online) (Optical Society of America, 2014), paper SM1G.6 (4 pages).
Bosworth et al., "High-speed ultrawideband photonically enabled compressed sensing of sparse radio frequency signals," Opt. Lett. 38(22):4892-4895 (2013).
Candes et al., "Near Optimal Signal Recovery From Random Projections: Universal Encoding Strategies?" IEEE Trans. on Information Theory 52(12):5406-5425 (2006) Submitted Oct. 2004, Revised Mar. 2006.
Candes et al., An Introduction to Compressive Sampling [A sensing/sampling paradigm that goes against the common knowledge in data acquisition], IEEE Signal Processing Magazine, vol. 25 No. 2, 21-30 (Mar. 2008).
Chen et al., "Atomic decomposition by basis pursuit," SIAM Journal on Scientific Computing 20(1): 33-61 (1998).
Chi et al., "Microwave spectral analysis based on photonic compressive sampling with random demodulation," Opt. Lett. 37(22):4636-4638 (2012).
Chou et al., "Adaptive RF-Photonic Arbitrary Waveform Generator," IEEE Photonics Technology Letters 15(4): 581-583 (2003).
Chou et al., "Photonic bandwidth compression front end for digital oscilloscopes," J. Lightwave Technology 27(22):5073-5077 (2009).
Coldren et al., "High-efficiency 'receiverless' optical interconnects," Proc. GOMACTech, paper No. 9.4, Monterey, CA: 2 pages (2004).
Coldren et al., "Tunable Semiconductor Lasers: A Tutorial," Journal of Lightwave Technology 22(1):193-202 (2004).
Coldren, "Scalable and Reliable Photonic Integrated Circuits for Scalable and Reliable WDM Networks," Proc. Contemporary Photonics Technology Conference, paper No. A1, Tokyo, Japan: 2 pages (2004).
Dong et al., "Scaling up echo-state networks with multiple light scattering," arXiv preprint arXiv: 1609.05204v3, 5 pages (submitted on Sep. 15, 2016 and last updated Feb. 13, 2018).
Donoho, "Compressed Sensing," IEEE Trans. on Information Theory 52(4):1289-1306 (2006) (Epub Sep. 14, 2014).
Drineas et al., "RandNLA: Randomized Numerical Linear Algebra," Communications of the ACM 59(6): 80-90 (Jun. 2016).
Fish et al., "Wavelength Agile, Integrated Analog Optical Transmitters," Proc. GOMACTech, Monterey, CA: 225-228 (2004).
Gupta et al., "Power scaling in time stretch analog-to-digital converters," Proceedings of Avionics, Fiber-Optics and Phototonics and Photonics Technology Conference, AVFOP '09. IEEE, pp. 5-6 (Sep. 22-24, 2009).
Horisaki et al., "Learning-based imaging through scattering media," Optics Express 24(13):13738-13743 (2016).
Johansson et al., "High-Speed Optical Frequency Modulation in a Monolithically Integrated Widely-Tunable Laser—Phase Modulator," Proc. OFC 2004, paper No. FL2, Los Angeles, CA: 3 pages (2004).
Johansson et al., "Monolithically integrated 40GHz pulse source with >40nm wavelength tuning range," Proc. Integrated Photonics Research, paper No. IPD4, San Francisco, CA: 3 pages (2004).
Johansson et al., "Sampled-grating DBR laser integrated with SOA and tandem electroabsorption modulator for chirp-control," Electronics Letters 40(1): 2 pages (2004).
Koh et al., "A Millimeter-Wave (40-45 GHz) 16-Element Phased-Array Transmitter in 0.18-µm SiGe BiCMOS Technology," IEEE Journal of Solid-State Circuits, 44(5):1498-1509 (2009).
Lee et al., "33MHz Repetition Rate Semiconductor Mode-Locked Laser Using eXtreme Chirped Pulse Oscillator," Conference on Lasers and Electro-Optics/Quantum Electronics and Laser Science Conference and Photonic Applications Systems Technologies, OSA Technical Digest (CD), 2 pages (Optical Society of America, 2008), paper CTuU7.
Lee et al., "Extreme Chirped Pulse Oscillator (XCPO) Using a Theta Cavity Design," IEEE Photonics Technology Letters 18(7):799-801 (2006).
Loris, Ignace, "L1Packv2: A Mathematica package for minimizing an $\ell$1-penalized functional," pp. 1-17 (Aug. 20, 2008); [retrieved online on Aug. 20, 2008] from the Internet <URL: http://adsabs.harvard.edu/abs/2008CoPhC.179..895L>.
Mahoney, "Randomized algorithms for matrices and data," Foundation and Trends in Machine Learning, Now Publishers: 1-54 (2011).
McKenna et al., "Wideband Photonic Compressive Sampling Analog-to-Digital Converter for RF Spectrum Estimation," In Proceedings of Optical Fiber Communication Conference, (Anaheim, Calif., 2013), paper OTh3D.1 (3 pages).
Min, "SiGe/CMOS Millimeter-Wave Integrated Circuits and Wafer-Scale Packaging for Phased Array Systems," A dissertation submitted in partial fulfillment of the requirements for the degree of Doctor of Philosophy in the University of Michigan (2008) (154 pages).
Mishali et al., "From Theory to Practice: Sub-Nyquist Sampling of Sparse Wideband Analog Signals," [retrieved online on Nov. 10, 2009] from the Internet <URL:http://arxiv.org/abs/0902.4291v3>, pp. 1-17.
Redding et al., "All-fiber spectrometer based on speckle pattern reconstruction," Opt. Express 21(5):6584-6600 (2013).

(56) References Cited

OTHER PUBLICATIONS

Redding et al., "Evanescently coupled multimode spiral spectrometer." Optica 3.9: 956-962 (2016).
Saade, et al. "Random Projections through multiple optical scattering: Approximating kernels at the speed of light." 2016 IEEE International Conference on Acoustics, Speech and Signal Processing (ICASSP). IEEE, 2016.(pp. 1-6).
Schrauwen et al., "An overview of reservoir computing: theory, applications and implementations," ESANN'2007 proceedings—European Symposium on Artificial Neural Networks, Bruges, Belgium, Apr. 25-27, 2007, pp. 471-482.
Sefler et al., "Holographic Multichannel Radio-Frequency Correlator," Optical Engineering 39(1):260-266 (2000).
Sefler et al., "Wide Bandwidth, High Resolution TimeStretch ADC Scalable to Continuous-Time Operation," Proceedings of Conference on Lasers and Electro-Optics, 2009 and 2009 Conference on Quantum electronics and Laser Science Conference, CLEO/QELS 2009, pp. 1-2 (Jun. 2-4, 2009).
Piels et al., "Compact silicon multimode waveguide spectrometer with enhanced bandwidth," Sci. Rep. 7:43454 (2017); (pp. 1-7).
Tropp et al., "Beyond Nyquist: Efficient Sampling of Sparse Bandlimited Signals," IEEE Transactions on Information Theory 56(1):520-544 (2010).
Tropp et al., "Signal recovery from random measurements via orthogonal matching pursuit," IEEE Trans. on Information Theory 53(12): 4655-4666 (2007).
Valley et al., "Applications of the orthogonal matching pursuitJnonlinear least squares algorithm to compressive sensing recovery," Applications of Digital Signal Processing, ed. C. Cuadrado-Laborde, Intech, Croatia (2011): 169-190.
Valley et al., "Compressive sensing of sparse radio frequency signals using optical mixing," Opt. Lett. 37 (22):4675-4677 (2012).
Valley et al., "Multimode waveguide speckle patterns for compressive sensing," Opt. Lett. 41(11):2529-2532 (2016).
Valley et al., "Optical multi-coset sampling of GHz-band chirped signals," Proc. SPIE vol. 9362 93620M-1 (Mar. 14, 2015); [retrieved online on Jul. 29, 2015], from the Internet <URL:http://proceedings.spiedigitallibrary.org/>, pp. 1-7.
Valley et al., "Optical time-domain mixer," in Optics and Photonics for Information Processing IV, Abdul Ahad Sarni Awwal; Khan M. Iftekharuddin; Scott C. Burkhart, Editors, Proceedings of SPIE vol. 7797 (SPIE, Bellingham, WA 2010), 77970F.
Valley et al., "Sensing RF signals with the optical wideband converter," in Broadband Access Communication Technologies VII, Benjamin B. Dingel; Raj Jain; Katsutoshi Tsukamoto, Editors, Proceedings of SPIE vol. 8645 (SPIE, Bellingham, WA 2013), 86450P.
Valley, "Photonic Analog to Digital Converters," Optics Express 15(5):1955-1982 (2007).
Walden, "Analog-to-digital conversion in the early 21st century," Wiley Encyclopedia of Computer Science and Engineering, (edited by Benjamin Wah) Hoboken: John Wiley & Sons, Inc., pp. 1-14 (Sep. 9, 2008).
Wang et al., "Efficient, Integrated Optical Transmitters for High-Speed Optical Interconnect Applications," Proc. IEEE/LEOS Workshop on Interconnections Within High Speed Digital Systems, Santa Fe, NM: 3 pages (2004).
Wei et al., "New Code Families for Fiber-Bragg-Grating-Based-Spectral-Amplitude-Coding Optical CDMA Systems," IEEE Photonic Technology Letters 13(8):890-892 (2001).

\* cited by examiner $$x(t+1) = f\left( \boxed{w} \; x(t) \; + \; \boxed{a} \; u(t) \right)$$

$$y(t) = \left( \; b \; \right) \; x(t)$$

FIG. 2
(PRIOR ART)

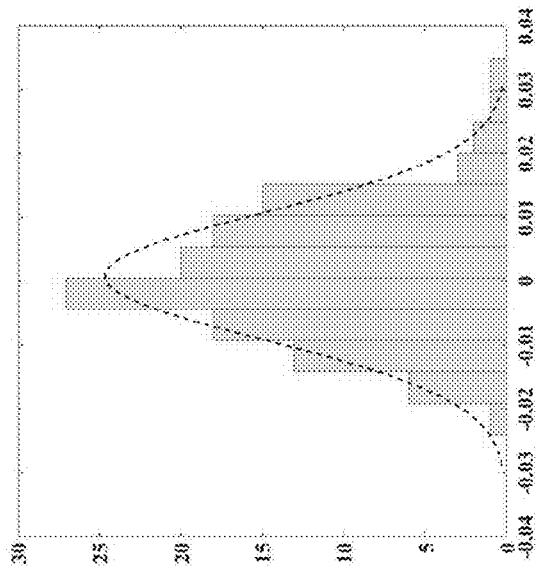
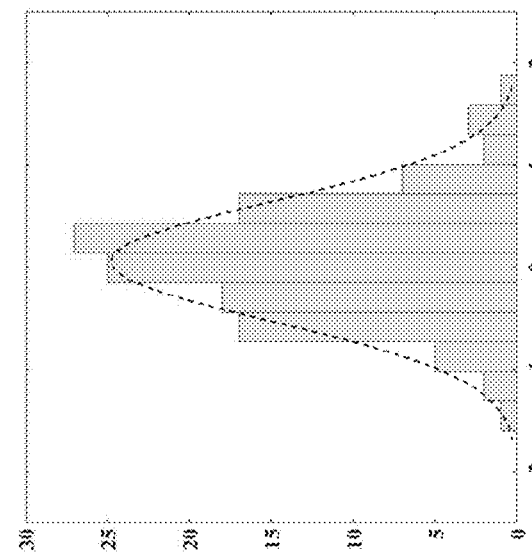
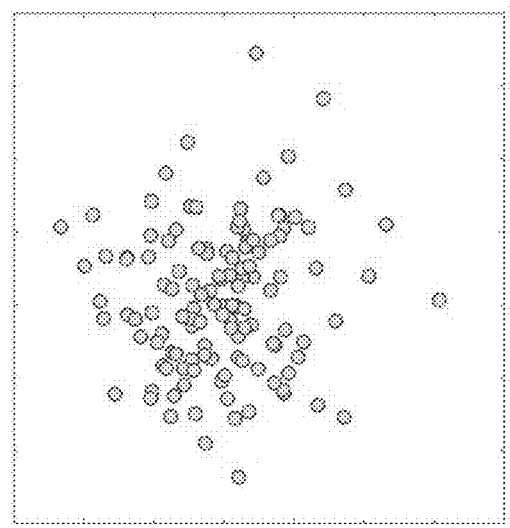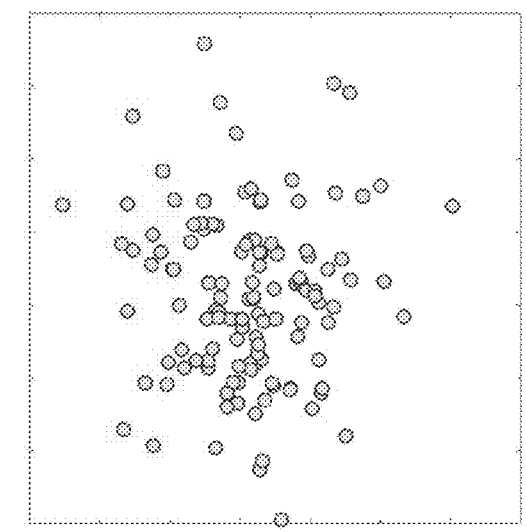
FIG. 6A  FIG. 6B
Complex distribution of speckle output
FIG. 7A  FIG. 7B
Random complex normal distribution

RESERVOIR COMPUTING OPERATIONS USING MULTI-MODE PHOTONIC INTEGRATED CIRCUITS

FIELD

This application generally relates to reservoir computing.

BACKGROUND

Reservoir computing is a recently developed class of machine learning, and can be useful for time domain applications. Reservoir computing techniques can include performing matrix operations, such as linear or nonlinear matrix multiplication. However, when matrix dimensions can be on the order of 1000s by 100000s or more, the matrix operations can take a significant amount of computational time and power.

SUMMARY

Embodiments of the present invention provide reservoir computing operations using multi-mode photonic integrated circuits (PICs).

Under one aspect, a method for performing an operation is provided. The method can include receiving, by different physical locations of a multi-mode waveguide, an input signal and a plurality of coefficients imposed on laser light. The method also can include generating, by the multi-mode waveguide, a speckle pattern based on the different physical locations, the input signal, and the plurality of coefficients. The method also can include adjusting at least one of the coefficients based on the speckle pattern.

In some configurations, optionally the input signal is imposed onto the laser light by an input optical modulator, and the plurality of coefficients respectively are imposed onto the laser light by neuronal optical modulators. Optionally, the input optical modulator and the neuronal optical modulators are coupled to the multi-mode waveguide via respective waveguides. Additionally, or alternatively, optionally adjusting at least one of the coefficients based on the speckle pattern includes generating one or more electrical signals based on a received portion of the speckle pattern. Optionally, an array of photodetectors respectively coupled to the neuronal optical modulators generates the one or more electrical signals based on the received portion of the speckle pattern. The coefficient imposed on the laser light by the neuronal optical modulators optionally is adjusted based on the one or more electrical signals. Optionally, the neuronal optical modulators respond nonlinearly to the one or more electrical signals. Additionally, or alternatively, the photodetectors optionally receive the speckle pattern via respective waveguides. In some configurations, optionally the method includes generating an output signal based collectively on the one or more electrical signals. Optionally, adjusting the at least one of the coefficients can include adjusting a gain of at least one of the one or more electrical signals based on a comparison of the output signal to the input signal to the output signal. The input signal optionally can be time-varying, and the output signal can be predictive of the input signal. As a further or alternative option, the laser light can be generated by a continuous-wave, single wavelength laser.

Under another aspect, a circuit for performing an operation is provided. The circuit can include a multi-mode waveguide configured to receive, at different physical locations, an input signal and a plurality of coefficients imposed on laser light. The multi-mode waveguide can be configured to generate a speckle pattern based on the different physical locations, the input signal, and the plurality of coefficients. The circuit also can include circuitry configured to adjust at least one of the coefficients based on the speckle pattern.

In some configurations, the circuit includes an input optical modulator configured to impose the input signal onto the laser light; and the circuitry includes neuronal optical modulators respectively configured to impose the plurality of coefficients onto the laser light. Optionally, the circuit further includes respective waveguides coupling the input optical modulator and the neuronal optical to the multi-mode waveguide. Additionally, or alternatively, the circuitry optionally can be configured to generate one or more electrical signals based on a received portion of the speckle pattern and to adjust the at least one of the coefficients based on the speckle pattern based on the one or more electrical signals. Optionally, the circuitry can include an array of photodetectors coupled to one of the neuronal optical modulators and configured to generate the one or more electrical signals based on the received portion of the speckle pattern, wherein the coefficient imposed on the laser light by that neuronal optical modulator is adjusted based on the one or more electrical signals. Additionally, or alternatively, the neuronal optical modulators optionally can be configured to respond nonlinearly to the one or more electrical signals. Additionally, or alternatively, the circuit includes respective waveguides coupling the photodetectors to the multi-mode waveguide so as to receive the speckle pattern. Additionally, or alternatively, the circuitry optionally is configured to generate an output signal based collectively on the one or more electrical signals. Additionally, or alternatively, the circuitry further optionally is configured to adjust the at least one of the coefficients by adjusting a gain of at least one of the one or more electrical signals based on a comparison of the output signal to the input signal to the output signal. Optionally, the input signal is time-varying, and the output signal is predictive of the input signal. Additionally, or alternatively, optionally the laser light is generated by a continuous-wave, single wavelength laser.

BRIEF DESCRIPTION OF THE DRAWINGS

The patent or application file includes at least one drawing executed in color. Copies of this patent or patent application publication with color drawing(s) will be provided by the Office upon request and payment of the necessary fee.

FIG. 2 schematically illustrates a mathematical formulation of a prior art reservoir computing operation.

FIGS. 6A-6B are plots respectively illustrating complex and real distributions of simulated speckle output from the multi-mode waveguide of FIGS. 4A-4B, according to one exemplary configuration.

FIGS. 7A-7B are plots respectively illustrating complex and real distributions of random numbers.

FIGS. 10A-10B schematically illustrate operations for forming matrices such as respectively illustrated in FIGS. 9A-9B.

DETAILED DESCRIPTION

Embodiments of the present invention provide reservoir computing operations using multi-mode photonic integrated circuits (PICs). The present multi-mode PICs can execute reservoir computing operations in real-time, with relatively low power consumption, and at relatively high frequencies by performing matrix operations, such as linear or nonlinear matrix multiplications, in the optical domain using a multi-mode waveguide and adjusting the time-varying values of "neurons" in the reservoir computer based on such matrix operations.

Figure 1:
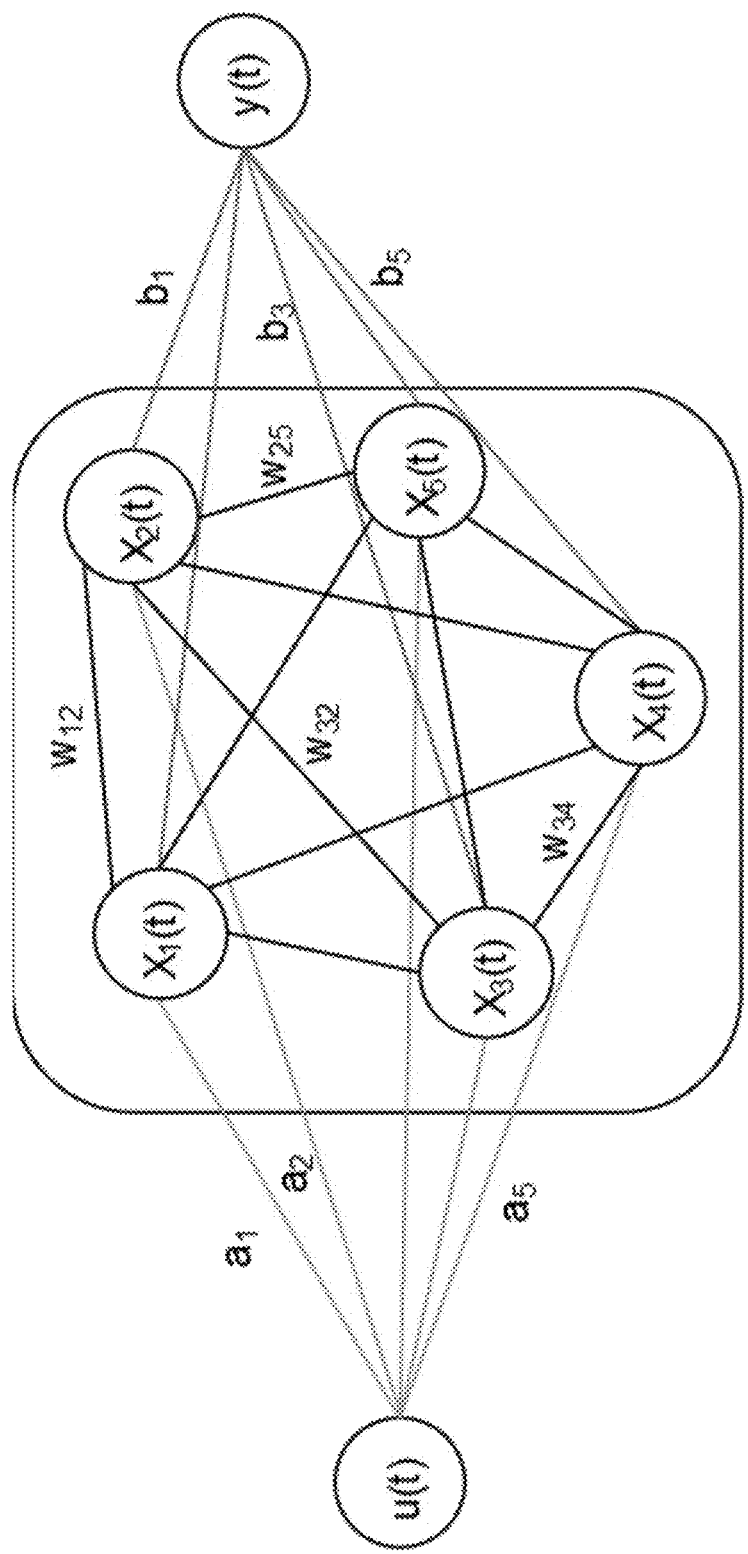
FIG. 1 schematically illustrates a graphical representation of a prior art reservoir computing network.

FIG. 1 schematically illustrates a graphical representation of a prior art reservoir computing network. In it, one or more inputs u(t) are connected to each of the "neurons" $x_i(t)$ of the network with input coefficients $a_i$. Within the network of neurons, each neuron $x_i(t)$ is connected to all other neurons with network coefficients $w_{ij}$. Additionally, each of the neurons $x_i(t)$ in the network is connected to one or more outputs y(t) with output coefficients $b_i$. Note that the time-varying values of the neurons $x_i(t)$ can be expressed as a column vector x(t) of size n×1, the values of the input coefficients $a_i$ can be expressed as a column vector a of size n×1, the values of the network coefficients $w_{ij}$ can be expressed as a square matrix w of size n×n, and the values of the output coefficients $b_i$ can be expressed as a row vector b of size 1×n.

Figure 2:
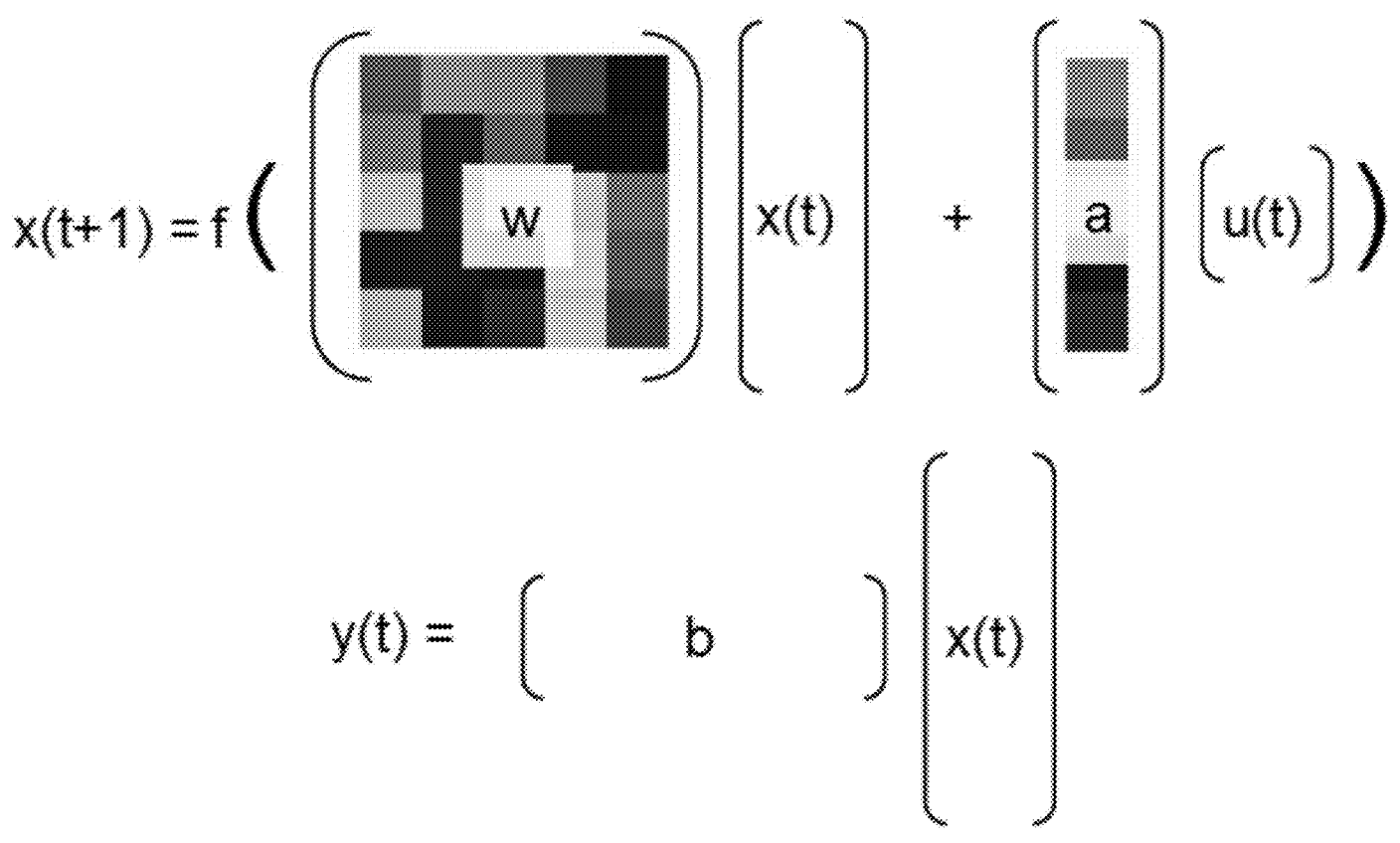

One aspect of such a reservoir computing network is that the input coefficients $a_i$ and network coefficients $w_{ij}$ are random and fixed. The only training required for such a reservoir computing network takes place at the output coefficients $b_i$, which are adjusted to produce the desired system response. FIG. 2 schematically illustrates a mathematical formulation of a prior art reservoir computing operation for adjusting the values of output coefficients $b_i$. This operation follows discrete time steps t by using the formula illustrated in FIG. 2 which can be expressed as:

$$x(t+1) = f(w \cdot x(t) + au(t)) \quad (1)$$

$$y(t) = b \cdot x(t) \quad (2)$$

In equation (1), $f(\ )$ is a nonlinear activation function which is sufficiently nonlinear over the range of values produced by the network. For further details of reservoir computing and nonlinear activation functions, see Schrauwen et al., "An overview of reservoir computing: theory, applications and implementations," ESANN '2007 proceedings—European Symposium on Artificial Neural Networks, Bruges, Belgium, 25-27 Apr. 2007, pages 471-482, ISBN 2-930307-07-2, the entire contents of which are incorporated by reference herein. A commonly used nonlinear activation function is the hyperbolic tangent, tan h( ). However, many other nonlinear functions can achieve the desired result. For further details of exemplary nonlinear functions that can be used in reservoir computing, see Dong et al., "Scaling up echo-state networks with multiple light scattering," arXiv: 1609.05204v3, 5 pages (submitted on Sep. 15, 2016 and last updated Feb. 13, 2018), the entire contents of which are incorporated by reference herein.

Similar to other machine learning operations, most of the computational cost in a reservoir computing network such as illustrated in FIG. 1 implementing an operation such as illustrated in FIG. 2 and expressed in equations (1) and (2) occurs in the matrix multiplications at each step, which computational cost can be relatively large. In particular, the operation w·x(t) between the n×n matrix w and the n×1 column vector x(t) represent most of the computational cost. In exemplary electronics, evaluating this matrix product w·x(t) can involve at least $O(n^2)$ operations, which can carry an estimated energy cost of about 1 pJ/operation. As used herein, the term "about" means within an order of magnitude of the stated value. For commercial electronic integrated circuits (ICs) which process 128×128 matrices, this can result in power dissipation on the order of 50 W at 3 GHz clock frequency, not including data transfer and supporting subsystems which can increase the total system power by a factor of ten. In comparison, and as described in greater detail herein, the present multi-mode PIC can involve only O(n) operations at an estimated energy cost of about 100 fJ/operation, resulting in a comparable power dissipation of 40 mW for the same matrix size and clock frequency as the example provided for commercial electronic ICs—a power dissipation savings of several orders of magnitude. Because the present multi-mode PIC only involves O(n) operations, this performance improvement (power dissipation savings) can scale with the number of nodes (neurons) in the network. Indeed, as one example a 4× increase in nodes (neurons) can provide an additional order of magnitude reduction in power consumption relative to an electronic IC with the same number of nodes. Furthermore, the present multi-mode PIC can operate at speeds above 30 GHz, and therefore potentially can compute matrix operations an order of magnitude faster, enabling new applications in the RF domain which electronic ICs cannot address.

Figure 3A:
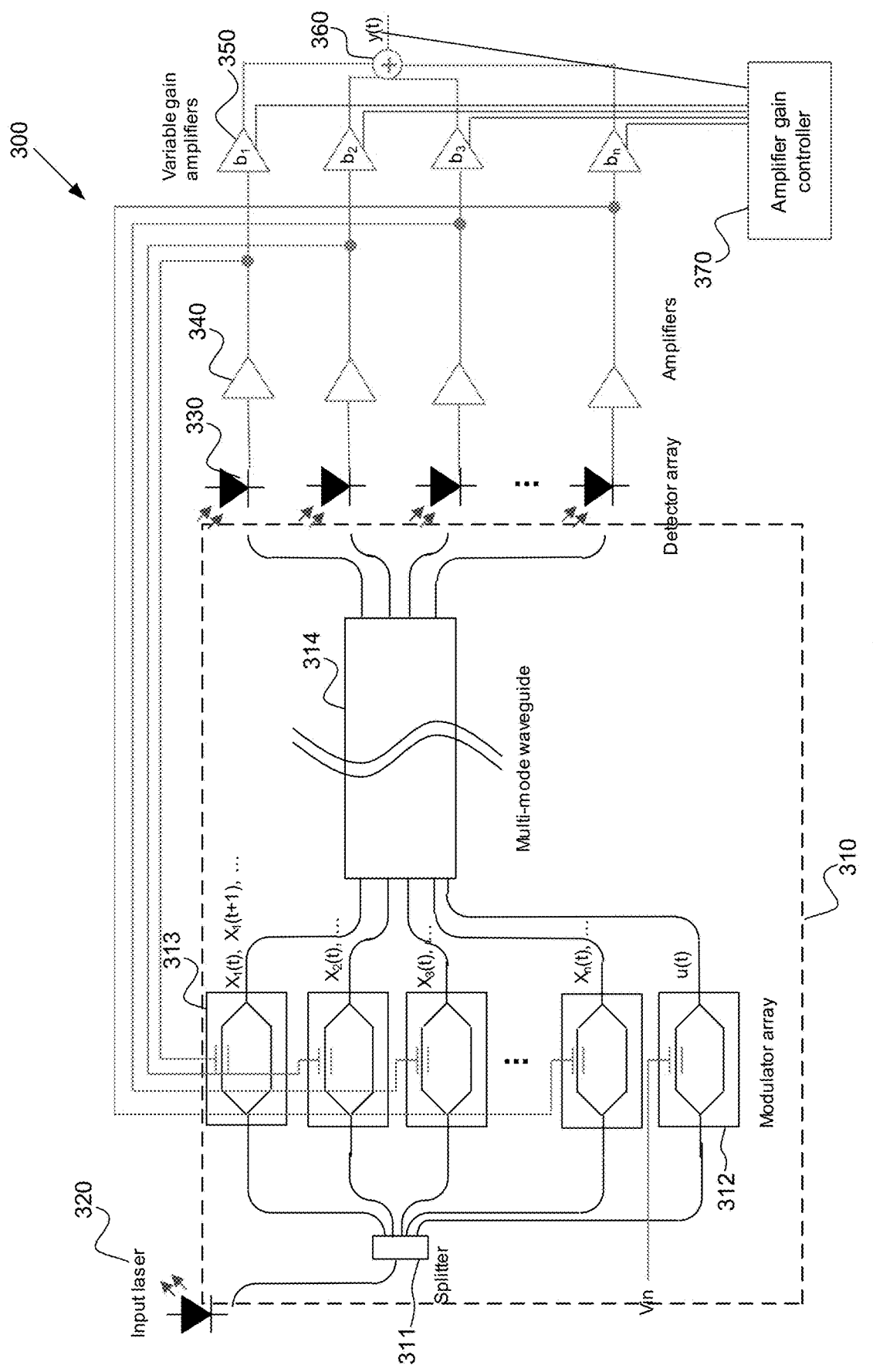
FIG. 3A schematically illustrates components of a reservoir computing circuit including a multi-mode photonic integrated circuit, according to one exemplary configuration.

FIG. 3A schematically illustrates components of a reservoir computing circuit 300 including a multi-mode photonic integrated circuit, according to one exemplary configuration. Reservoir computing circuit 300 illustrated in FIG. 3A includes photonic integrated circuit (PIC) 310 configured to receive at least one input signal Vin, one or more light sources 310, detector array 330 configured to generate electrical signals based on light output by PIC 310, optional amplifiers 340 configured to amplify the electrical signals generated by detector array 330, variable gain amplifiers 350 configured to apply respective output coefficients to the electrical signals from detector array 330 or from optional amplifiers 340, arithmetic circuit 360 configured to combine the outputs of variable gain amplifiers 350 with one another to generate an output predictive of the input signal Vin, and amplifier gain controller 370 coupled to the variable gain amplifiers 350 and configured to adjust the output coefficients respectively applied by variable gain amplifiers 350 based on a comparison of y(t) to Vin so as to cause y(t) to predict (be similar to or the same as) Vin.

PIC 310 can include splitter 311, a modulator array including an input optical modulator 312 and a plurality of neuronal optical modulators 313, and multi-mode waveguide 314. In one nonlimiting example, a continuous-wave single-frequency laser source serves as the light source 320 for the entire PIC 310, and is suitably coupled to splitter 311 of PIC 310, e.g., via a waveguide (not specifically labeled). Splitter 311 can be configured to split the light received from light source 320 between any suitable number of optical waveguides (not specifically labeled) which respectively are coupled to optical modulators of the modulator array. For example, splitter 311 can split the light received from light source 320 between n optical waveguides which feed n neuronal optical modulators 313, as well as input optical modulator 312.

The optical modulators of the modulator array, e.g., input optical modulator 312 and neuronal optical modulators 313, can include any suitable type of intensity and/or phase modulator. Each optical modulator of the modulator array also receives a respective electrical signal based on which that modulator modulates the intensity and/or phase of the light received from splitter 311. For example, input optical modulator 312 receives electrical input signal Vin, based upon which input optical modulator modulates the light it receives from splitter 311. Vin can be received from any suitable signal source that need not necessarily be considered to be part of reservoir computing circuit 300. For example, input optical modulator 312 can receive Vin via a suitable wired or wireless signaling pathway from a separate signal source (not specifically illustrated). Exemplary sources of Vin can include, but are not limited to, radar systems, communication systems, data processing, brain-machine interfaces, and robotics. Further exemplary sources that suitably can be used to provide Vin, and exemplary applications of reservoir computing, can be found in Schrauwen et al., "An overview of reservoir computing: theory, applications and implementations," ESANN'2007 proceedings—European Symposium on Artificial Neural Networks, Bruges, Belgium, 25-27 Apr. 2007, pages 471-482, ISBN 2-930307-07-2, the entire contents of which are incorporated by reference herein. For further details of an example Mach-Zehnder modulator (MZM) that can be used in the modulator array to impose signals on laser light, see U.S. Patent Publication No. 2018/0165248 to Valley et al., the entire contents of which are incorporated by reference herein. Other modulators, such as absorptive modulators based on the Franz-Keldysh effect or the quantum confined Stark effect, on-off keying, or other interferometric modulators, or resonant cavity modulators such as microring modulators, can also suitably be used.

Neuronal optical modulators 313 respectively receive electrical signals from detectors of detector array 330 or from respective amplifiers 340, based upon which they respectively modulate the light they receive from splitter 311. In this regard, note that the use of the term "neuronal" for optical modulators 313 is intended to indicate that the respective output light intensity from these modulators can be considered to represent the states of the neurons $x_i(t)$ of a reservoir computer in a manner such as described further below. In some configurations, the optical modulators of the modulator array have a nonlinear response function. That is, in some configurations the intensity or phase of light respectively transmitted by the modulators of the modulator array can be a nonlinear function of the electrical signals respectively applied to those modulators. This nonlinear function can be considered to correspond to $f(\ )$ in equation (1). In one nonlimiting example, the nonlinear response function is $\cos(\ )^2$, which is the response function of a Mach-Zehnder intensity modulator. Native nonlinearity of the modulator can be used to implement $f(\ )$. Alternatively, the modulator can be designed and configured so as to implement a desired nonlinear function $f(\ )$.

The outputs from the optical modulators 312, 313 of the array are then input via respective waveguides (not specifically labeled) to a multi-mode waveguide 314 having a sufficient number of modes, e.g., having at least as many transverse nodes as there are optical inputs to waveguide 314, e.g., n+1 transverse modes. For example, an irregular multi-mode waveguide with sufficient length generates a random optical speckle pattern at the output of the waveguide due to the different propagation constants of the transverse optical modes. For further details, see Valley et al., "Multimode waveguide speckle patterns for compressive sensing," Optics Letters 41, 2529-2532 (2016), the entire contents of which are incorporated by reference herein. In the configuration illustrated in FIG. 3, each waveguide output from a respective optical modulator 312, 313 has a different physical position entering the multi-mode waveguide 314. Therefore, the modulated light entering multi-mode waveguide 314 from these different respective positions can excite a different longitudinal mode, optionally with a different relative strength, and therefore produce a respective unique speckle pattern at the output of multi-mode waveguide 314.

In various configurations, multi-mode waveguide 314 can include a fiber, or a planar waveguide. PIC 310 optionally can include a reticle (not specifically illustrated) to couple the respective outputs of the modulator array into multi-mode waveguide 314. Exemplary characteristics of multi-mode optics 130 are provided elsewhere herein and in U.S. Pat. No. 9,413,372 to Valley, the entire contents of which are incorporated by reference herein. For details of another exemplary multi-mode waveguide that suitably can be used in system 300, see Redding et al., "Evanescently coupled multimode spiral spectrometer." Optica 3.9: 956-962 (2016). For another example of a waveguide that suitably can be used as multi-mode waveguide 314, see Piels et al., "Compact silicon multimode waveguide spectrometer with enhanced bandwidth," Scientific Reports 7, 1-7 (2017), the entire contents of which are incorporated by reference herein.

Multi-mode waveguide 314 can be configured so as to output a speckle pattern based on laser light it receives from input optical modulator 312 and neuronal optical modulators 313. By "multi-mode waveguide" it is meant a passive optical component that supports a plurality of electromagnetic propagation modes for light that is input thereto from different physical locations, in which different of such propagation modes coherently interfere with one another so as to produce a speckle pattern. By "speckle pattern" it is meant an irregular, aperiodic pattern in which at least a first portion of the pattern includes an optical intensity profile that is different than an optical intensity profile of at least a second portion of the pattern that is spatially separated from the first portion of the pattern. By "optical intensity profile" it is meant the respective intensities (amplitudes) of the light in different regions of space.

A length and width of the multi-mode waveguide 314 can be selected so as to provide a sufficient number of electromagnetic propagation modes, e.g., at least n+1 electromagnetic propagation modes. For example, the width can be selected to provide the n+1 modes, and the length can be selected to provide sufficient mixing of the modes. At the end of multi-mode waveguide 314 are a suitable number of output waveguides respectively coupled to photodetectors of detector array 330, e.g., n output waveguides connected to n photodetectors. Each output waveguide receives a portion of the speckle pattern generated by multimode waveguide 314, which portion can contain contributions from some or all of the modes excited by the inputs to multimode waveguide 314, that is, by the outputs from the optical modulators 312, 313 which are input to waveguide 314 at respective physical locations. As noted above, detector array 330 is configured to generate electrical signals based on light output by PIC 310. More specifically, in some configurations each photodetector of detector array 330 is coupled to multi-mode waveguide 314 so as to generate an electrical signal based on the portion of the speckle pattern received by that photodetector. Optionally, amplifiers 340 are configured to amplify the electrical signals generated by detector array 330. Variable gain amplifiers 350 are configured to apply respective output coefficients to the electrical signals from detector array 330 or from optional amplifiers 340 responsive to control by amplifier gain controller 370, and arithmetic circuit 360 configured to combine the outputs of variable gain amplifiers 350 with one another to generate and provide to amplifier gain controller 370 an output y(t) predictive of the input signal Vin.

Operation for the PIC 310 within reservoir computer circuit 300 can be described as follows. For each waveguide input to the multi-mode waveguide 314 (from the modulator array), the speckle pattern generated by multi-mode waveguide 314 distributes light randomly across the output waveguides (to the detector array). Therefore, the optical fields in each output waveguide can be expressed as:

$$g_1(t) = w_{11}x_1(t) + w_{12}x_2(t) + \ldots w_{1n}x_n(t) + a_1u(t) \quad (3)$$

$$g_2(t) = w_{21}x_1(t) + w_{22}x_2(t) + \ldots w_{2n}x_n(t) + a_2u(t) \quad (4)$$

$$g_n(t) = w_{n1}x_1(t) + w_{n2}x_2(t) + \ldots w_{nn}x_n(t) + a_nu(t) \quad (5)$$

In equations (3)-(5), $g_i(t)$ represents the optical field amplitude in the $i^{th}$ output waveguide, and the elements $w_{ij}$ represent the transmission coefficients from the $j^{th}$ input waveguide to the $i^{th}$ output waveguide. These transmission coefficients $w_{ij}$ are determined by the modes of the multi-mode waveguide 314 that are excited based on the locations of respective input waveguides (from the n modulators 313) and the locations of the respective output waveguides (to the photodetectors of detector array 330), and correspond to the elements of square matrix w in equation 1. The input coefficient values a also are determined by the modes of the multi-mode waveguide 314 that are excited based on the location of the input waveguide from input modulator 312 and the locations of the respective output waveguides (to the photodetectors of detector array 330), and correspond to the elements of column vector a in equation 1. The time-varying value u(t) corresponds to Vin, which is imposed by input modulator 312. From equations (3)-(5), it may be understood that, responsive to inputs from input optical modulator 312 and neuronal optical modulators 313, multi-mode waveguide 314 generates the function g(t)=w·x(t)+au(t), which corresponds to the argument of the nonlinear function $f(\ )$ in equation (1), passively and without any power dissipation during this computation step. Applying the nonlinear function $f(\ )$ to the argument g(t)=w·x(t)+au(t) yields the next time step values x(t+1) for the set of reservoir computer neurons (nodes), in accordance with equation (1).

In the exemplary configuration illustrated in FIG. 3A, the respective electrical output signals from the photodetectors of detector array 330, corresponding to respective elements $g_i(t)$, can be used to control the neuronal optical modulators 313 in the analog domain and to apply the nonlinear function $f(\ )$ in a feedback loop. For example, the photodetectors of detector array 330 optionally can be connected to electronic amplifiers 340 which are coupled to and drive neuronal optical modulators 313, thereby changing the light intensity at the output of modulator output from x(t) to the next value in the reservoir computer operation sequence, x(t+1), in accordance with equation (1). The nonlinear activation function $f(\ )$ can be applied using any suitable component or combination of components in circuit 300, for example, can be applied using any suitable combination of neuronal optical modulators 313, detectors 330, and/or amplifiers 340. In one example in which the nonlinear activation function is applied substantially entirely using neuronal optical modulators 313, the photodetectors 330 generate voltages linearly proportional to the number of photons they respectively receive, the electronic amplifiers 340 produce voltages linearly proportional to the currents of the photodetectors they are respectively coupled, and each neuronal optical modulator 313 applies a nonlinear activation function $f(\ )$ to the value $g_i(t)$ that it receives via detector array 330 and optional amplifiers 340, e.g., $f(\ ) = \cos(\ )^2$ for a Mach-Zehnder modulator. Other nonlinearities can also be utilized in the photodetectors (e.g., photodiodes) 330 and/or electronic amplifiers 340, for example depending on photodiode bias and amplifier operating point.

As noted further above, the reservoir computing operations expressed in equations (1) and (2) further include generation of the reservoir computing circuit output, y(t)=b·x(t) in accordance with equation (2), where y(t) is predictive of u(t), which in FIG. 3A corresponds to Vin applied to input optical modulator 312. In the configuration of FIG. 3A, reservoir computing circuit 300 generates y(t) by generating a sum, by arithmetic circuit 360, of the outputs of an array of variable gain electronic amplifiers 350 which receive the outputs of detector array 300 directly, or indirectly via optional amplifiers 340. For example, the coefficients b are trained during implementation of equations (1) and (2), and the variable gain amplifiers 350 respectively apply the values of b to x(t) and are trained by amplifier gain controller 370 which receives y(t) and adjusts the respective gains of those amplifiers to make y(t) similar to or the same as Vin.

Figure 3B:
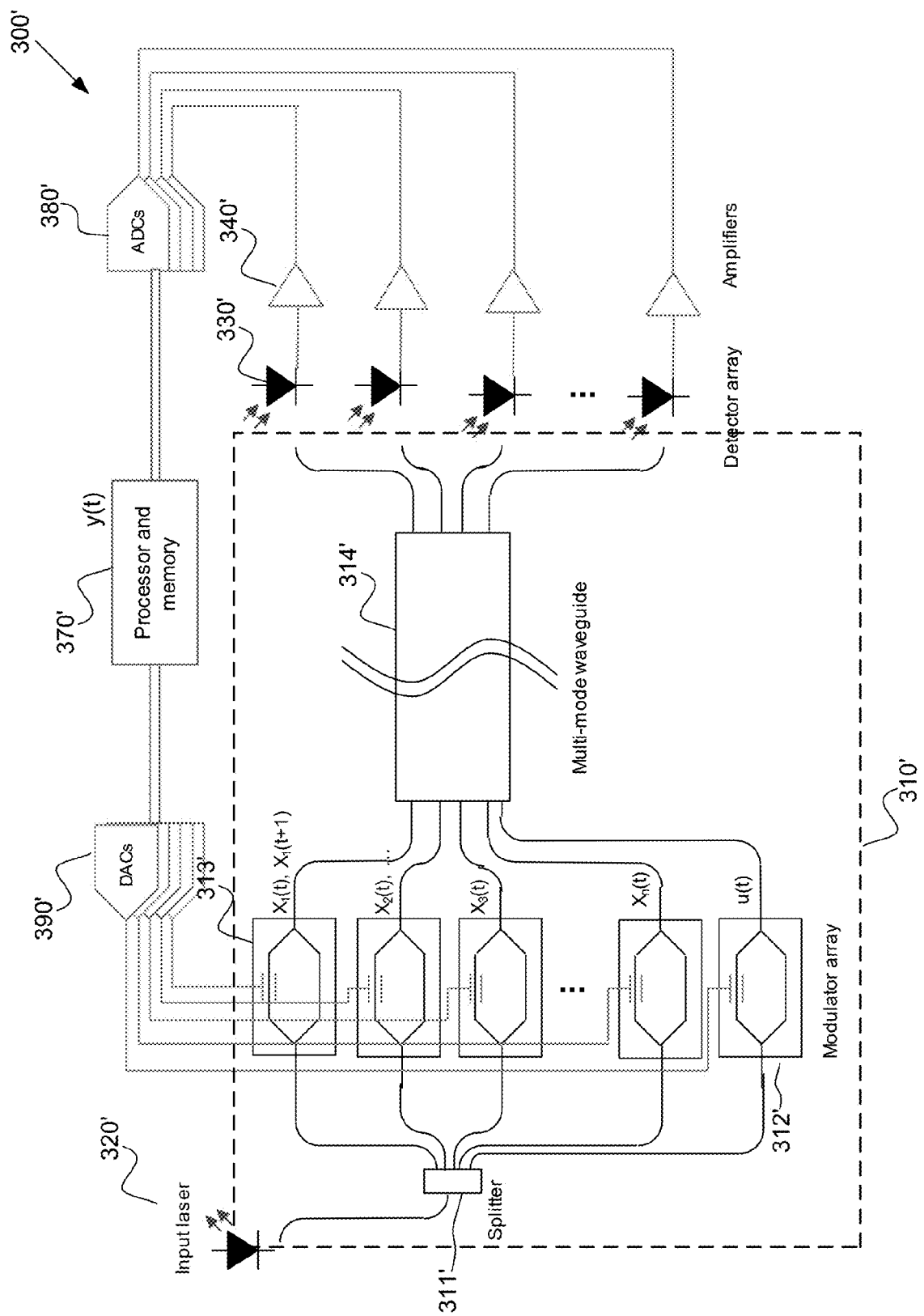
FIG. 3B schematically illustrates components of another reservoir computing circuit including a multi-mode photonic integrated circuit, according to one exemplary configuration.

As another option, the electrical outputs from the photodetectors of detector array 330, which receive the respective elements g(t) from multi-mode waveguide 314, can be digitized with traditional electronic analog to digital converters (ADCs) and remainder of the reservoir computing operation computed in the digital domain. For example, FIG. 3B schematically illustrates components of another reservoir computing circuit 300' including a multi-mode photonic integrated circuit, according to one exemplary configuration. Reservoir computing circuit 300' can be configured similarly as reservoir computing circuit 300, e.g., includes PIC 310' (including splitter 311', modulator array 312', 313', and multimode waveguide 314'), input laser 320', detector array 330', and amplifiers 340' respectively configured similarly as PIC 310 (including splitter 311, modulator array 312, 313, and multimode waveguide 314), input laser 320, detector array 330, and amplifiers 340) illustrated in FIG. 3A. In reservoir computing circuit 300' the output of detector array 330' can be provided to amplifiers 340' in a similar manner as detector array 330 provides output to amplifiers 340 such as described with reference to FIG. 3A. However, in the configuration illustrated in FIG. 3B, the respective outputs of amplifiers 340', which collectively can be considered to correspond to y(t), can be digitized using ADCs 380' and provided to processor and memory 370' which can sum the outputs of ADCs 380' to generate output y(t) and compares such outputs to Vin. The output of modulator array 313' can be controlled using processor and memory 370' which, based upon the comparison between y(t) and Vin, provides outputs to DACs 390' which provide analog control signals to modulators 313'. In such a configuration, the values of b are set within the processor and memory 370'.

Figure 4B:
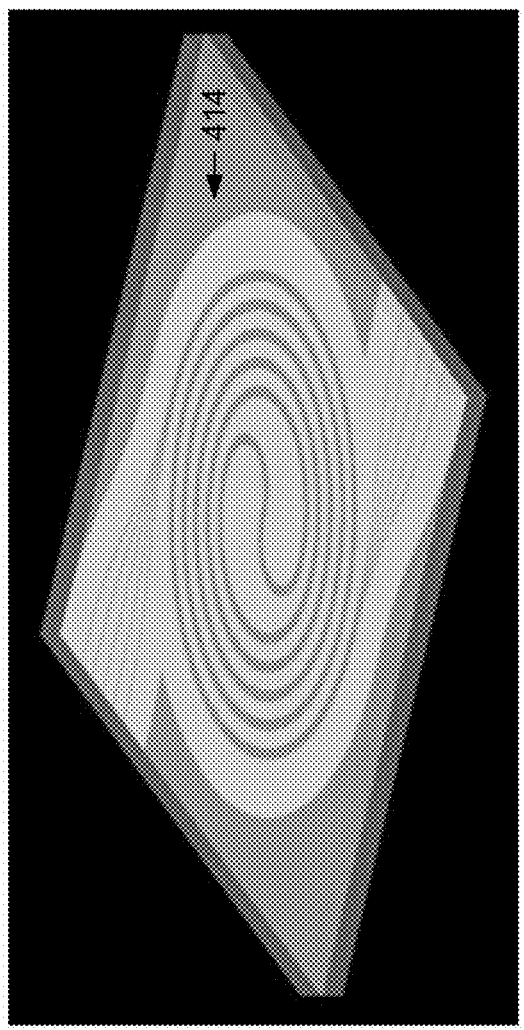
FIGS. 4A-4B schematically illustrate plan and perspective views of a multi-mode waveguide suitable for use in multi-mode photonic integrated circuits such as illustrated in FIGS. 3A-3B, according to one exemplary configuration.
Figure 4A:
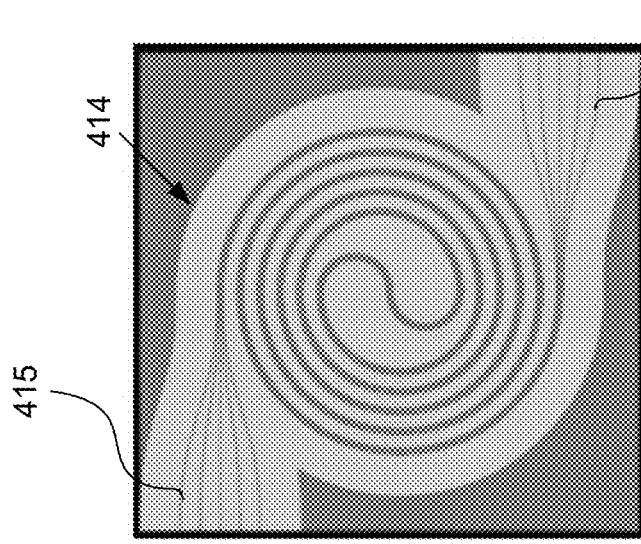

FIGS. 4A-4B schematically illustrate plan and perspective views of a multi-mode waveguide suitable for use in multi-mode photonic integrated circuits such as illustrated in FIGS. 3A-3B, according to one exemplary configuration. Multi-mode waveguide 414 can have a generally spiral shape, allowing for a relatively long waveguide within a relatively small footprint. Multi-mode waveguide 414 can be coupled to, e.g., can be integrally formed with, a plurality of input waveguides 415 which respectively can be coupled to and receive modulated light from input optical modulator 312 and neuronal optical modulators 313 illustrated in FIGS. 3A-3B. Each input waveguide 415 can be coupled to a different physical location at the input of multi-mode waveguide 414. Multi-mode waveguide 413 also can be coupled to, e.g., can be integrally formed with, a plurality of output waveguides 416 which respectively can be coupled to and output light from multimode waveguide 413 to photodetectors of detector array 330, 330' respectively illustrated in FIGS. 3A-3B. Each output waveguide 416 can be coupled to a different physical location at the output of multi-mode waveguide 413. Light input on different ones of the input waveguides 415 can excite different transverse modes of multi-mode waveguide 413 and can generate different speckle patterns received by respective ones of the output waveguides 416.

Figure 5B:
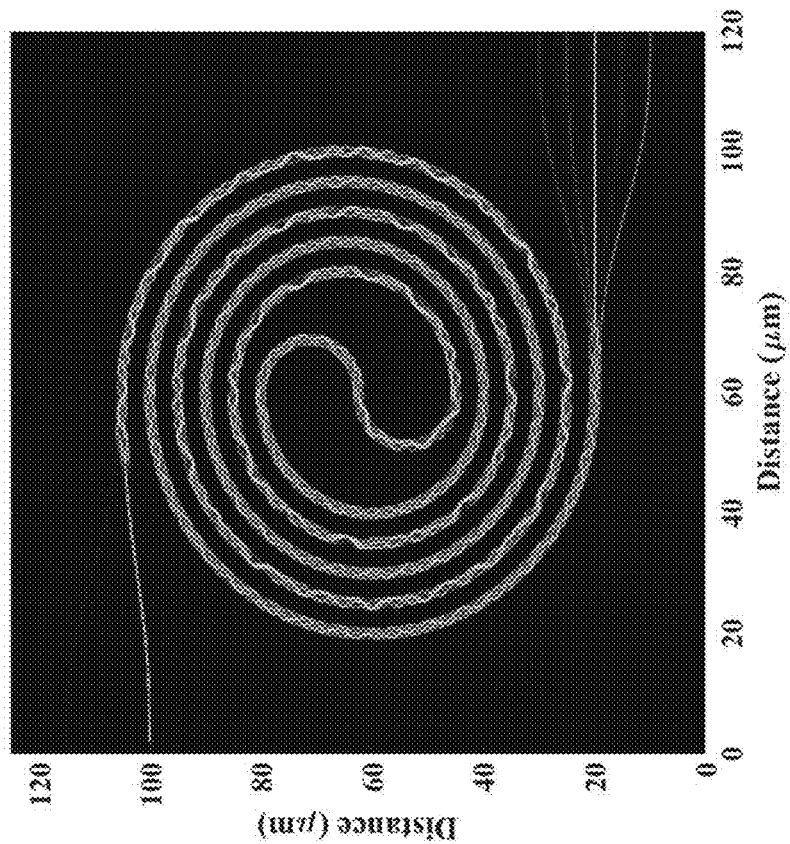
FIGS. 5A-5B respectively schematically illustrate simulated propagation of light through the multi-mode waveguide based on light input at different physical locations of the waveguide, according to one exemplary configuration.
Figure 5A:
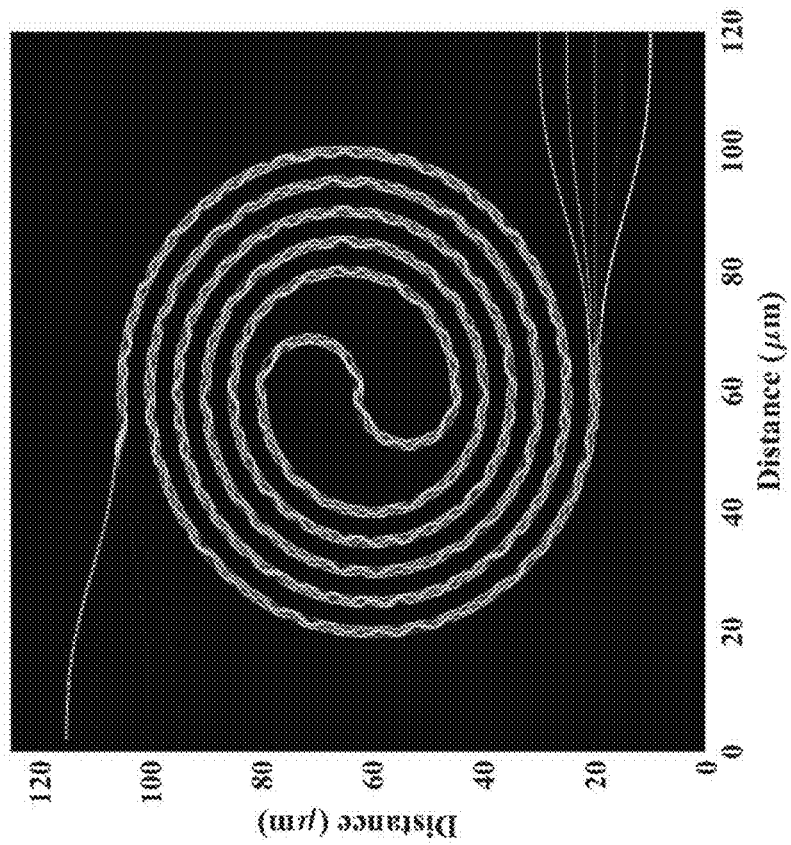

For example, FIGS. 5A-5B respectively schematically illustrate simulated propagation of light through the multi-mode waveguide based on light input at different physical locations of the waveguide, according to one exemplary configuration. The simulations were performed with the finite-difference time-domain (FDTD) method on the exemplary 5 input and 5 output multi-mode waveguide device illustrated in FIGS. 4A-4B. This particular 5×5 device was chosen to reduce the simulation to a reasonable time, and it should be appreciated that similar results can be obtained for devices having other configurations and greater or lesser numbers of inputs and/or outputs. In the simulations respectively illustrated in FIGS. 5A-5B, either the first or the fourth one of the input waveguides 415 was excited and the simulation was run until the light input on that waveguide 415 had propagated through the multi-mode waveguide 413 and output waveguides 416, where the output amplitudes were recorded. It may be understood from FIGS. 5A and 5B that for light respectively input on the first input waveguide and fourth input waveguide 415, the multi-mode waveguide imparted a distinct (unique) output transfer function. Although FIGS. 4A-4B and 5A-5B illustrate an example spiral multi-mode waveguide 413 coupled to five input waveguides 415 and five output waveguides 416, it should be appreciated that the present multi-mode waveguides can have any suitable shape, any suitable number of inputs and outputs, and can support any suitable number of transverse excitation modes.

A test simulation was performed using a physical implementation of the multi-mode waveguide 413 of FIGS. 4A-4B with random input amplitudes. The result from the test simulation was compared to the output patterns from simulations performed such as described with reference to FIGS. 5A-5B to verify the matrix multiplication functionality of the device.

To assess whether or not the random speckle generated by multimode waveguides is viable for reservoir computing, the distribution of transmission coefficients was measured and a representative random distribution was then tested in a simple reservoir computing program. FIGS. 6A-6B are plots respectively illustrating complex and real distributions of simulated speckle output from the multi-mode waveguide of FIGS. 4A-4B, according to one exemplary configuration. FIGS. 6A-6B show the distribution of transmission coefficients from 25 simulations of the multi-mode waveguide of FIGS. 4A-4B. As can be expected, the coefficients follow a complex normal distribution centered at zero. FIGS. 7A-7B are plots respectively illustrating complex and real distributions of random numbers, shown for comparison, from which it may be understood that the simulated speckle output follows a similar distribution as the random distribution.

Figure 8A:
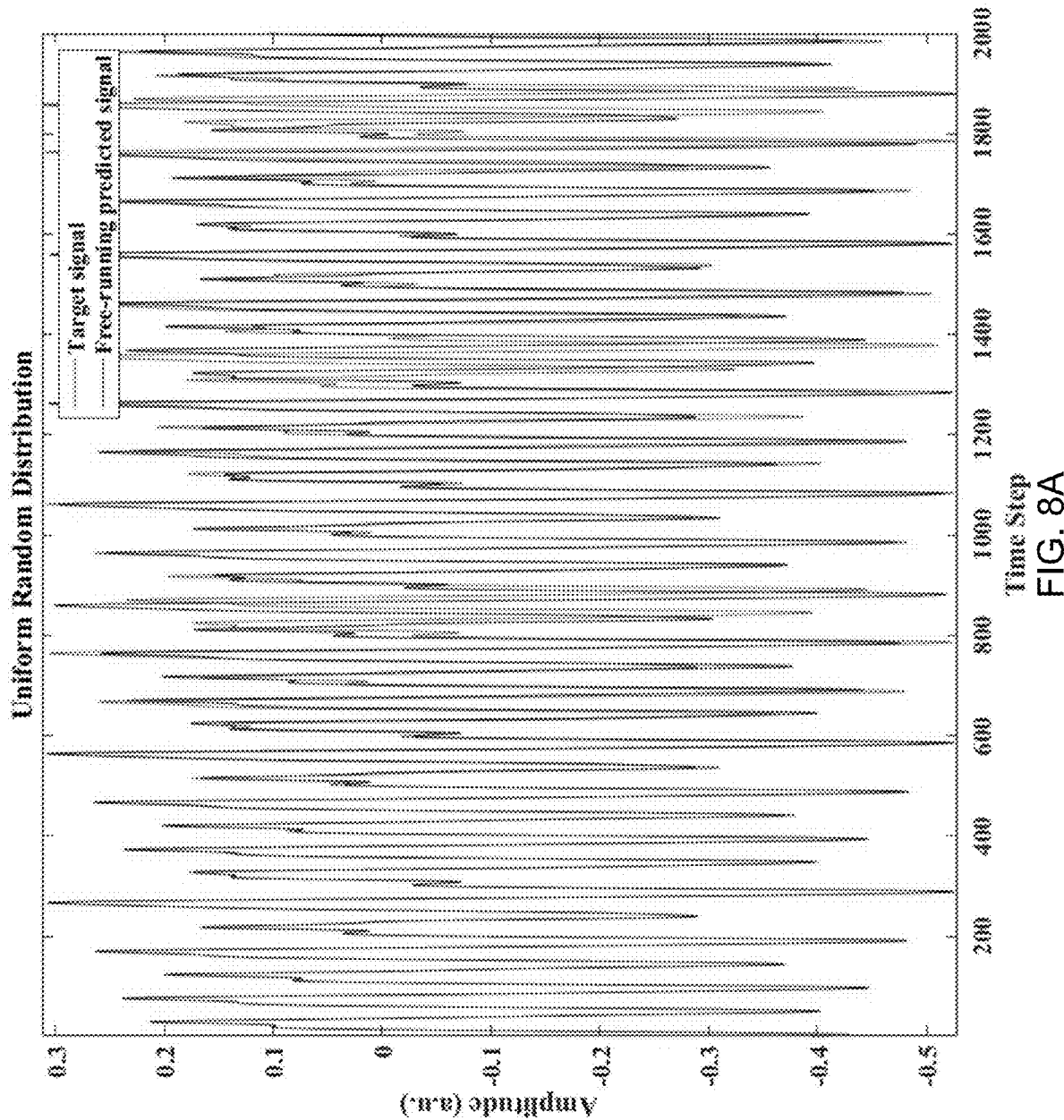
FIGS. 8A-8B are plots illustrating prediction, by reservoir computing operations, of a Mackey-Glass time series.
Figure 8B:
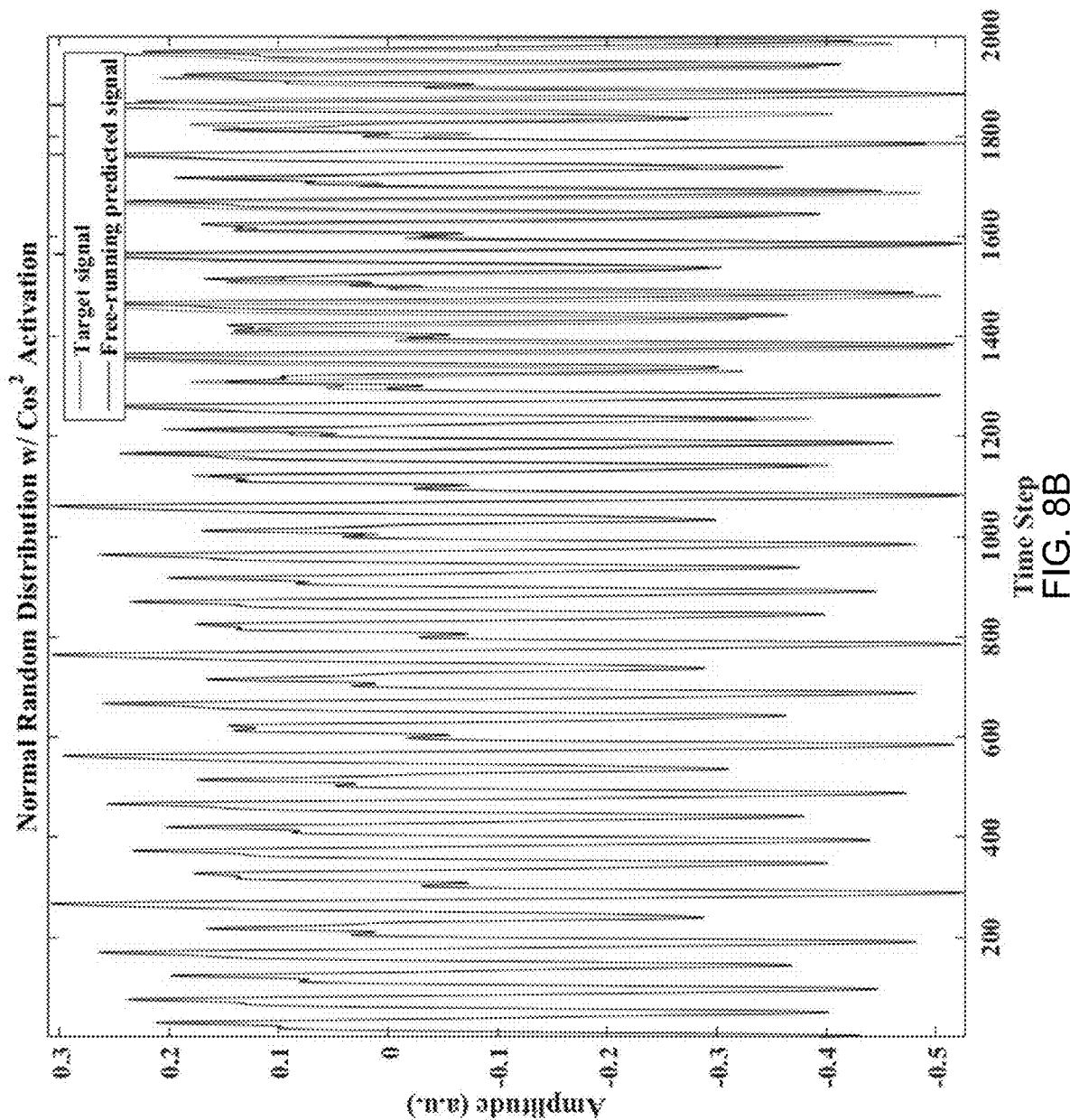

The randomly generated coefficients following the complex normal distribution were tested in a simple reservoir computing program with the task of predicting a Mackey-Glass time series. FIGS. 8A-8B are plots illustrating prediction, by reservoir computing operations, of the Mackey-Glass time series. More specifically, FIG. 8A shows the result of the original reservoir computing program, which compares the target signal with the signal predicted by the reservoir computer operation. In this implementation of the program the random coefficients are uniformly distributed and the nonlinear activation function is a hyperbolic tangent function. In comparison, FIG. 8B shows the result of the modified reservoir computing program, where the random coefficients have been replaced by the complex normal distribution and the nonlinear activation function is cosine squared function. In this particular case, the modified operation (FIG. 8B) may be understood to perform better than the original (FIG. 8A), with a mean-squared error that is two orders of magnitude lower.

In PIC configurations such as illustrated in FIGS. 3A-3B, the number of nodes (neurons) in the reservoir is equal to the number of modulators in array 313. Although the number of nodes can be scaled up simply by increasing the number of optical inputs and the corresponding width to the multimode waveguide, it potentially can become impractical to do so beyond several hundred nodes because of the area occupied by the modulators and photodetectors. However, the random speckle patterns generated by the multimode waveguide are not only position dependent, but also wavelength dependent. This allows the speckle pattern to be changed with the wavelength of the input light source, such as a tunable laser.

Figure 9B:
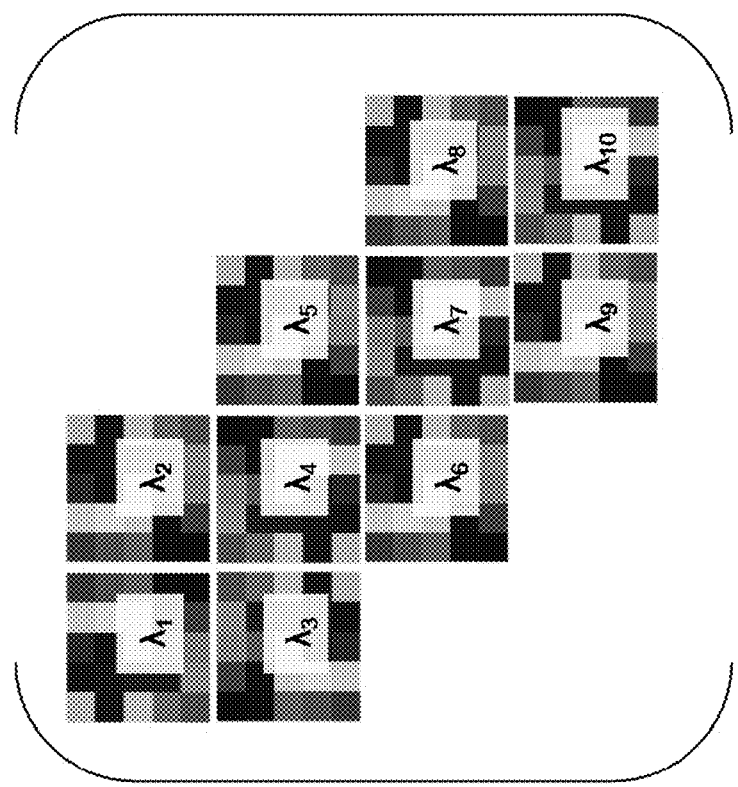
FIGS. 9A-9B respectively schematically illustrate matrices formed by a completely interconnected reservoir of neurons and partially interconnected reservoirs of neurons, according to exemplary configurations provided herein.
Figure 9A:
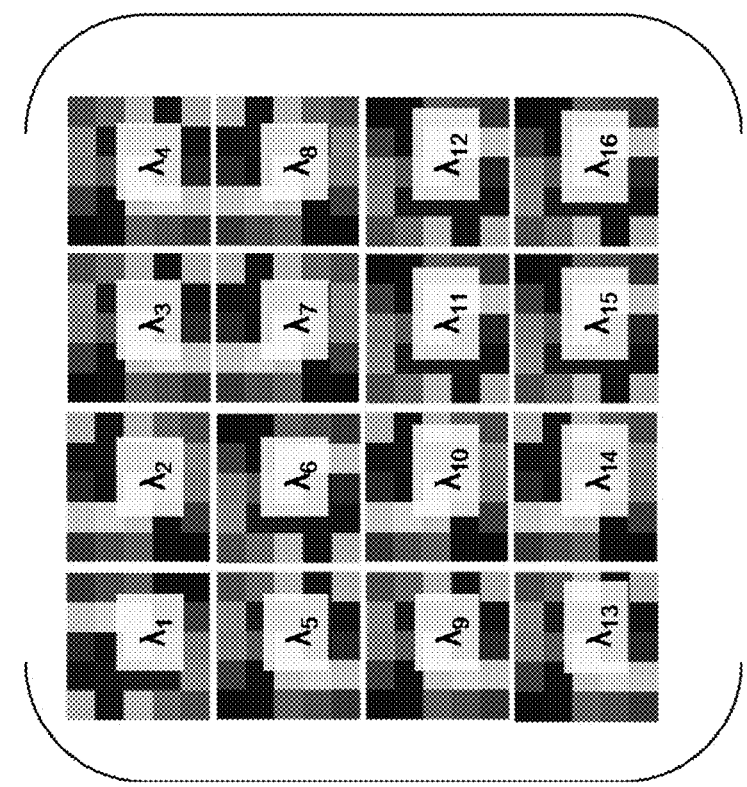
Figure 10A:
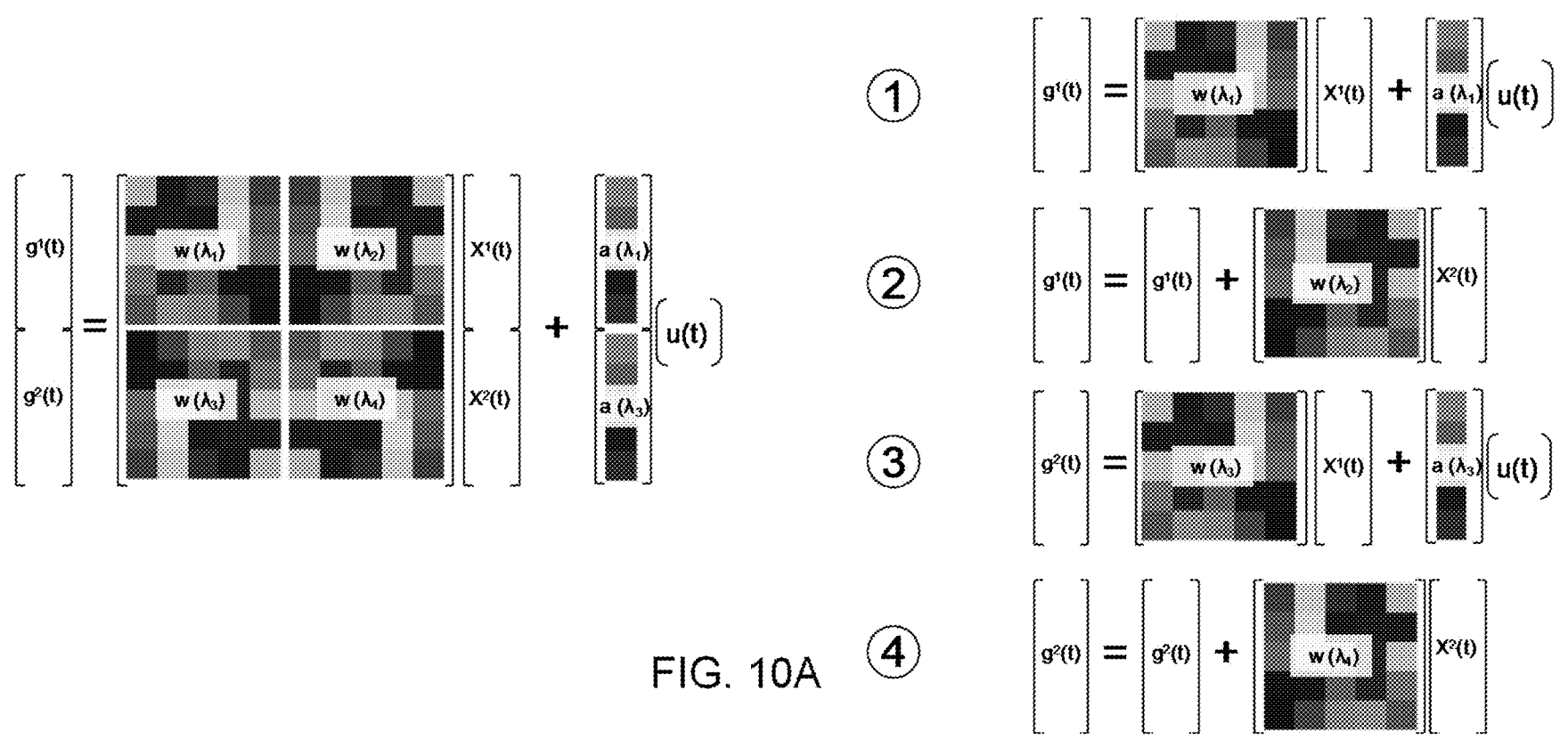
Figure 10B:
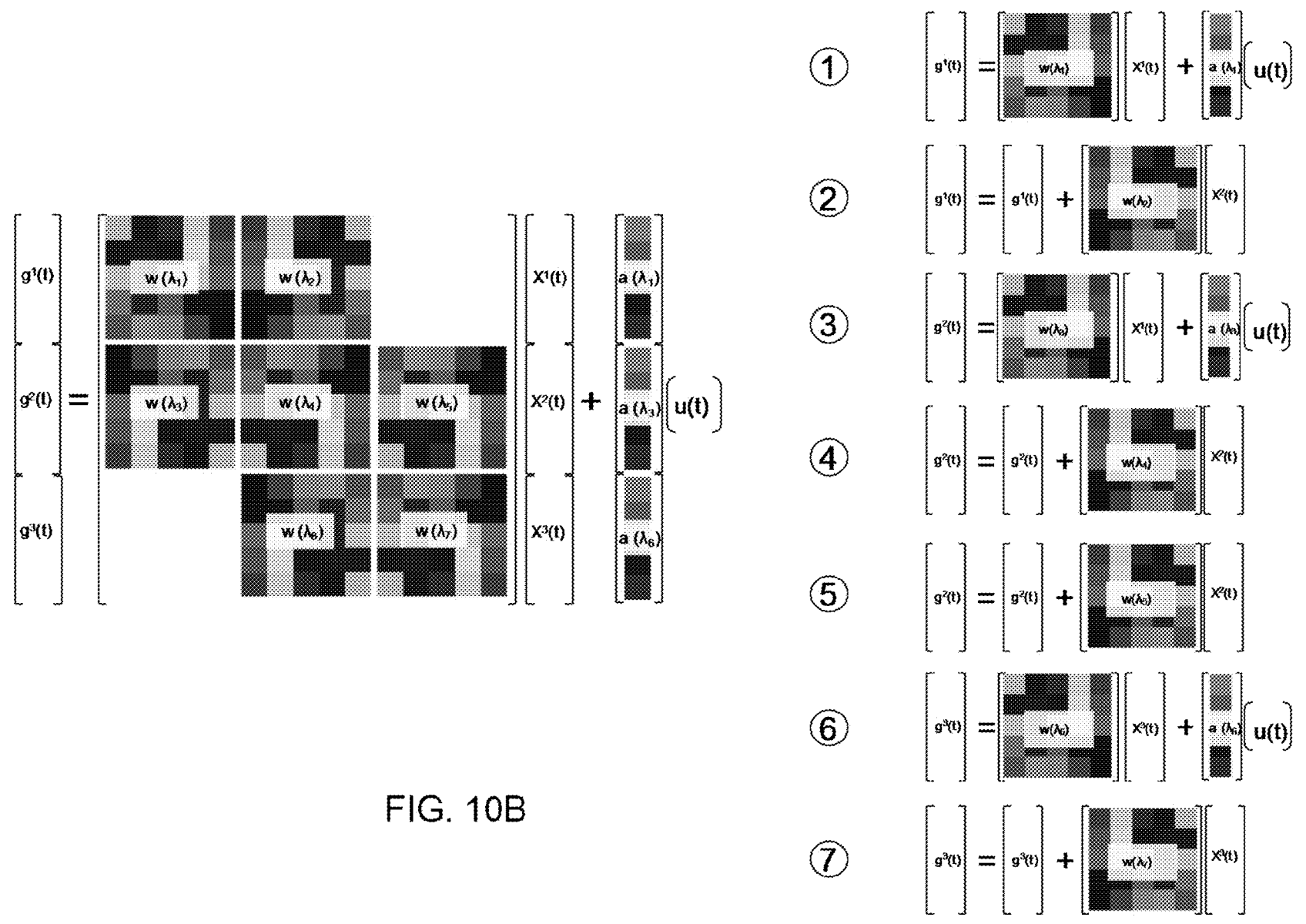

For example, FIGS. 9A-9B respectively schematically illustrate matrices formed by a completely interconnected reservoir of neurons and partially interconnected reservoirs of neurons, according to exemplary configurations provided herein, and FIGS. 10A-10B schematically illustrate operations for forming matrices such as respectively illustrated in FIGS. 9A-9B. As shown in FIG. 9A, the laser can be tuned to a number of discrete wavelengths ($\lambda_1, \lambda_2, \ldots \lambda_{16}$ in this example) to increase the number of nodes in the reservoir computer network. Instead of operating in a real time mode, each sub-matrix multiplication corresponding to a single one of wavelengths $\lambda_1, \lambda_2, \ldots \lambda_{16}$ can be processed sequentially;

for example, FIG. 10A shows in detail an exemplary procedure for scaling the reservoir size with multiple wavelengths. In the example illustrated in FIG. 10A, a matrix including four sub-matrices each corresponding to a wavelength is used, whereas the example illustrated in FIG. 9A includes sixteen sub-matrices each corresponding to a wavelength. Computing each matrix multiplication can include an operation for each different wavelength (four operations being shown in FIG. 10A). For example, each discrete wavelength can produce a different speckle pattern, therefore resulting in a different matrix of transmission coefficients $w(\lambda_n)$. Both the input vector x(t) and output vector g(t) can be split in multiple parts, e.g., two parts in FIG. 10A: $x^1(t)$, $x^2(t)$, $g^1(t)$, and $g^2(t)$. The first step sets the input wavelength to $\lambda_1$ and records $g^1(t)$ while setting the modulator array 313 to the values of $x^1(t)$ and input modulator 312 to u(t). The input wavelength is then changed to $\lambda_2$ and the new values of $g^1(t)$ are added to the previous values while the modulator array 313 is set to the values of $x^2(t)$ and the input modulator 312 is set to zero output. This process is then repeated for input wavelengths $\lambda_3$ and $\lambda_4$ to compute $g^2(t)$. In some configurations, the outputs from the photodetector (e.g., photodiode) array can be integrated with a capacitive element, either by the photodetector internal capacitance or external capacitor, to sum the values of $g^n(t)$ while the wavelength is changed to $\lambda_n$. In other configurations, these values can be stored in memory, with the summation taking place in the digital electronics.

Alternative methods of scaling reservoir network size are also considered. In some cases, a fully connected network of neurons may not be necessary. FIG. 10B illustrates an exemplary configuration in which a quasi-block diagonal matrix multiplication can be accomplished by using fewer discrete input wavelengths ($\lambda_1, \lambda_2, \ldots \lambda_7$ in this example). Rather than using a discrete wavelength corresponding to each possible matrix, some sub-matrices can be omitted from the computation, e.g., the upper right sub-matrix and lower left sub-matrix are omitted from the computation illustrated in FIG. 10B. This effectively creates a reservoir network where multiple sub-networks are only partially connected.

While this description has primarily focused on a particular configuration which uses multiple input and multiple output waveguides to a sufficiently long multi-mode waveguide, other configurations can be used. For example, a single input waveguide can be used in place of multiple-input waveguides if combined with a suitable multiplexing scheme. Examples of possible multiplexing schemes include time-domain multiplexing and wavelength division multiplexing. For time-domain multiplexing, the matrix multiplication can be performed by sequentially encoding the states of the neural network, $x_i(t)$, on the neuronal optical modulators while integrating the outputs of the photodetectors. For wavelength division multiplexing, an array of laser sources with different wavelengths can be used in place of a single laser source, because each wavelength will have a unique speckle pattern. The laser array can then be either directly modulated, or externally modulated to encode the states of the neural network on the laser output. The modulated laser outputs can be combined before entering the multi-mode waveguide, or input to the multi-mode waveguide at different positions.

Figure 11:
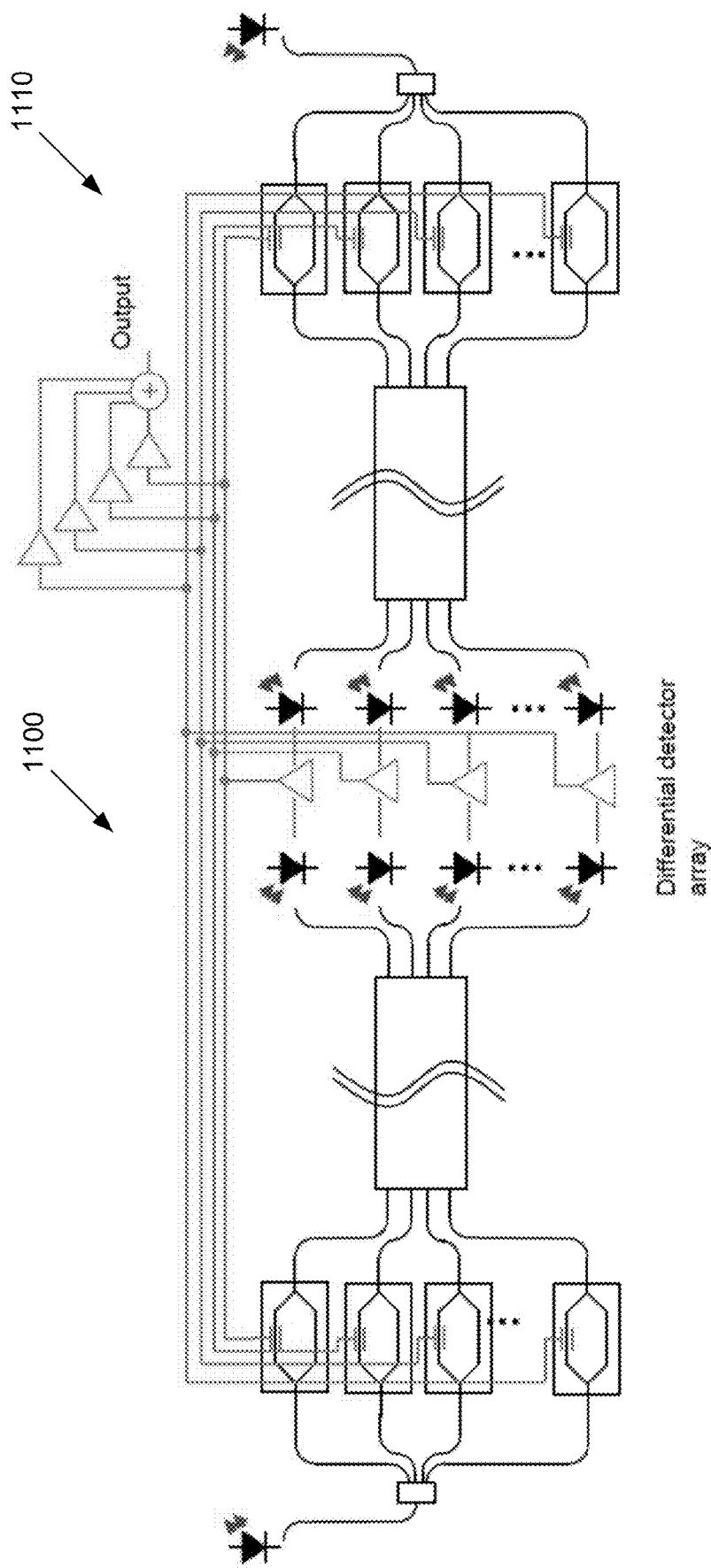
FIG. 11 schematically illustrates components of another reservoir computing circuit including a multi-mode photonic integrated circuit, according to one exemplary configuration.

Other variations of the detection scheme may also be used to achieve unique nonlinear activation functions. For example, FIG. 11 schematically illustrates components of another reservoir computing circuit including a multi-mode photonic integrated circuit, according to one exemplary configuration. In the configuration shown in FIG. 11, two parallel photonic reservoir computing circuits 1110, 1111, each configured similarly as PIC 310, 310' respectively described above with reference to FIGS. 3A-3B, have the output photodetectors wired in a differential detection scheme. Using differential detection can allow for nonlinear activation functions which have both positive and negative values, similar to the more commonly used hyperbolic tangent, tan h( ).

Note that any suitable arrangement and types of laser, optical modulators, multi-mode waveguides, photodetectors, amplifiers, arithmetic circuits and substrate(s) carrying such elements can be used. For example, any suitable combination of elements of the present circuits can be integrated in one or more suitable substrates. In one configuration, a reservoir computing circuit such as described with reference to FIG. 3A-3B or 11 can include a common substrate, such as a silicon substrate, on which any suitable number of laser, modulators, multi-mode waveguide, photodetectors (e.g., photodiodes), amplifiers, and arithmetic circuit are integrated. An example of a low-power modulator that suitably can be used with the present reservoir computing circuits is a microring or microdisk resonator modulator in a silicon photonics platform. An example of a low-power photodetector that suitably can be used with the present reservoir computing circuits includes a germanium photodiode in a silicon photonics platform, which can be the same platform in which the modulator is provided.

Figure 12:
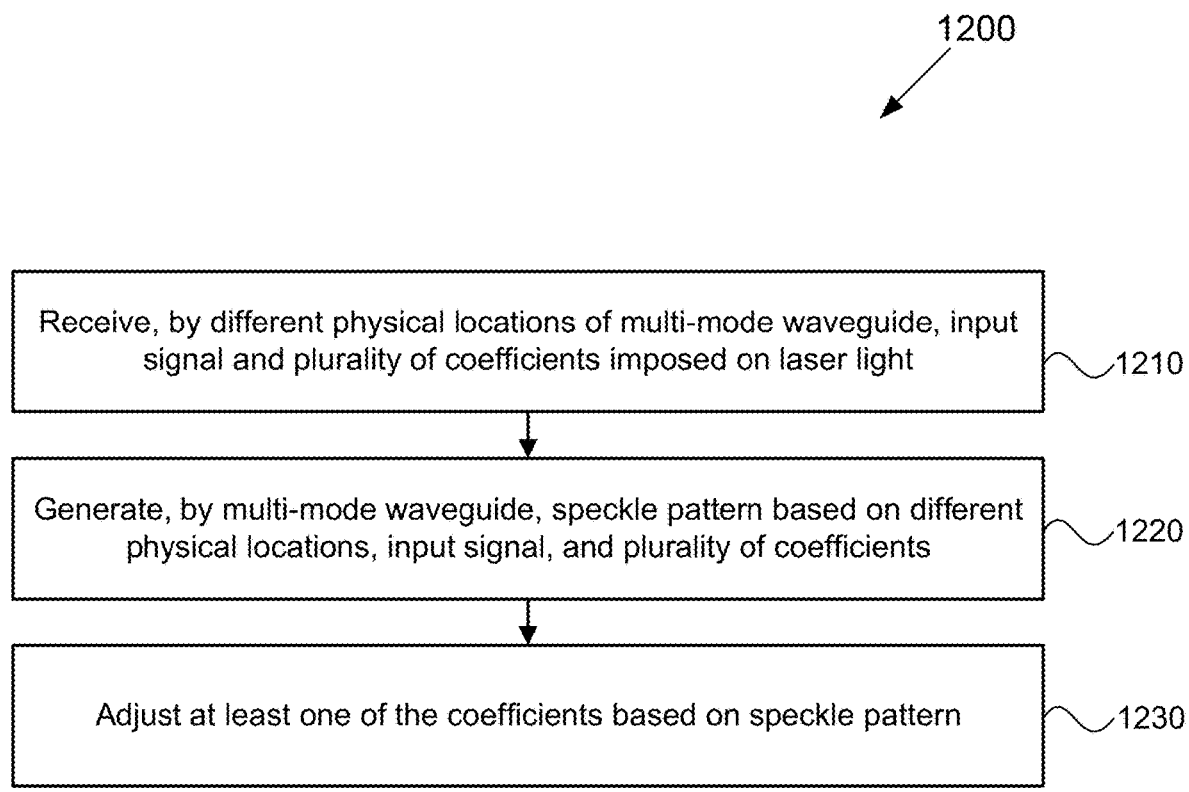
FIG. 12 illustrates steps in an exemplary method for performing reservoir computing operations using a multi-mode photonic integrated circuit, according to one example.

FIG. 12 illustrates steps in an exemplary method for performing reservoir computing operations using a multi-mode photonic integrated circuit, according to one example. In the nonlimiting configuration illustrated in FIG. 12, method 1200 includes receiving, by different physical locations of a multi-mode waveguide, an input signal and a plurality of coefficients imposed on laser light (operation 1210). For example, different physical locations of multi-mode waveguide 314, 314' respectively illustrated in FIGS. 3A-3B can receive laser light it receives via respective waveguides from respective optical modulators. In one exemplary configuration, the input signal can be imposed onto the laser light by an input optical modulator 312, 312', and the plurality of coefficients respectively can be imposed onto the laser light by neuronal optical modulators 313, 313' in a manner such as described elsewhere herein. The laser light can be, for example, generated by a continuous-wave, single wavelength laser. Optionally, the input optical modulator 312, 312' and the neuronal optical modulators 313, 313' are coupled to the multi-mode waveguide 314, 314' via respective waveguides.

Method 1200 illustrated in FIG. 12 also can include generating, by the multi-mode waveguide, a speckle pattern based on the different physical locations, the input signal, and the plurality of coefficients (operation 1220). For example, multimode waveguide 314, 314' respectively illustrated in FIGS. 3A-3B can generate such a speckle pattern in a manner such as described elsewhere herein.

Method 1200 illustrated in FIG. 12 also includes adjusting at least one of the coefficients based on the speckle pattern (operation 1230). For example, adjusting at least one of the coefficients based on the speckle pattern can include generating one or more electrical signals based on a received portion of the speckle pattern, for example in a manner such as described with reference to FIGS. 3A-3B. Illustratively, an array of photodetectors respectively coupled to the neuronal optical modulators can generate the one or more electrical signals based on the received portion of the speckle pattern, and the coefficient imposed on the laser light by the neuronal optical modulators can be adjusted based on the one or more electrical signals. For example, in the configuration illustrated in FIG. 3A, the coefficients respectively imposed on the laser light by neuronal optical modulators 313 can be adjusted based on control by amplifier gain controller 370 of variable gain amplifiers 350 based upon the outputs of detector array 330. Or, for example, in the configuration illustrated in FIG. 3B, the coefficients respectively imposed on the laser light by neuronal optical modulators 313' can be adjusted based on control by processor and memory 370' of signals that are applied to neuronal optical modulators 313' via DACs 390'. Regardless of the particular configuration, optionally the neuronal optical modulators (e.g., 313, 313') can respond nonlinearly to the one or more electrical signals in a manner such as described elsewhere herein. As a further or alternative option, the photodetectors (e.g., 330, 330') can receive the speckle pattern via respective waveguides.

In a manner such as described elsewhere herein, an output signal can be generated that is based collectively on the one or more electrical signals. For example, in the configuration illustrated in FIG. 3A, arithmetic circuit 360 can sum the outputs of variable gain amplifiers 350 to generate output y(t). As another example, in the configuration illustrated in FIG. 3B, processor and memory 370' can sum the outputs of ADCs 380' to generate output y(t) Optionally, adjusting the at least one of the coefficients can include adjusting a gain of at least one of the one or more electrical signals based on a comparison of the output signal to the input signal to the output signal. For example, in the configuration of FIG. 3A, based on a comparison of y(t) to Vin, amplifier gain controller 370 can control the electronic signals applied to neuronal optical modulators 313. As another example, in the configuration of FIG. 3B, based on a comparison of y(t) to Vin, processor and memory 370' can control the values respectively applied by DACs 390' to neuronal optical modulators 313'. As noted elsewhere herein, the input signal can be time-varying, and the output signal can be predictive of the input signal as a result of training the reservoir computing network.

Further information regarding an estimation of energy cost per operation of the present PICs, for example when integrated into reservoir computing circuits, can illustrate why such PICs provide a significant advance relative to all-electronic based devices for use in reservoir computing circuits.

For example, as can be understood from the exemplary configurations provided above with reference to FIGS. 3A-3B and FIG. 11, the energy use for a single operation for the present PIC primarily is that used by an optical modulator (e.g., one of neuronal optical modulators 313, 313' respectively illustrated in FIGS. 3A-3B) and by a photodetector (e.g., one of detector array 330, 330' respectively illustrated in FIGS. 3A-3B) which generates an electrical output used to control the optical modulator at the next time step; the multi-mode waveguide (e.g., waveguide 314) operates passively and therefore uses no energy. An example of a low-power modulator that suitably can be used with the present reservoir computing circuits is a microring or microdisk resonator modulator in a silicon photonics platform that requires a 1V drive voltage to modulate the optical signal On/Off with 30 GHz bandwidth. An example of a low-power photodetector that suitably can be used with the present reservoir computing circuits includes a germanium photodiode in a silicon photonics platform with 50 GHz bandwidth and a quantum efficiency of 0.9. The energy used to perform a reservoir computing operation can be considered to be or include that of converting the light input to the photodetector at the current time step to the light output from the modulator at the next time step. This energy cost can be calculated by thinking backward through the signal path starting with the 1V drive used by the modulator. For transmission of an RF signal to drive the modulator, the impedance is matched to a 50 Ohm transmission line, which combined with knowledge of the bandwidth of the modulator allows us to calculate the junction capacitance with a simple RC model. In this case, the capacitance of the modulator can be expressed as:

$$C_{mod} = \frac{1}{2\pi R f_{mod}} = \frac{1}{2\pi \cdot 50 \text{ Ohm} \cdot 3 \cdot 10^{10} \text{ Hz}} = 1.06 \cdot 10^{-13} \, F. \quad (6)$$

Given the capacitance of the modulator, the total charge required to produce the 1V drive can be calculated from:

$$Q = CV = 1.06 \cdot 10^{-13} F \cdot 1V = 1.06 \cdot 10^{-13} C \quad (7).$$

The total number of electrons needed to produce this charge then can be:

$$\frac{1.06 \cdot 10^{-13} \, C}{1.6 \cdot 10^{-19} \, C/\text{electrons}} = 6.63 \cdot 10^5 \text{ electrons}. \quad (8)$$

With an exemplary detector quantum efficiency of 0.9 and photon energy of about 0.8 eV for photons at about a 1550 nm wavelength, this can be converted to the number of photons and total energy of the photons required to produce the 1V drive as follows:

$$\frac{6.63 \cdot 10^5 \text{ electrons}}{0.9 \text{ electrons/photon}} = 7.37 \cdot 10^5 \text{ photons} \quad (9)$$

As may be understood from these estimation, the energy cost per operation of the optical devices using values from typical silicon photonics foundries is estimated to be on the order of 100 fJ. It should appreciated that other such value is only an estimate and can depend on the particular configuration used.

In view of the foregoing, it should be appreciated that the present PICs, and reservoir computing circuits incorporating such PICs, solve the problem of power demand for large scale computing operations, such as matrix multiplications in artificial intelligence applications. In addition to the power reduction, the higher operating frequency of the present PIC, as compared to electronic circuitry for performing matrix multiplications, can enable new applications in radio frequency (RF) signal processing which may not be achieved due to the low clock frequencies of conventional digital ICs.

It further should be appreciated that industrial and commercial applications of the present PICs and reservoir computing circuits can include, but are not limited to, the applications of reservoir computing in general. At present, these applications include speech recognition, time series prediction, signal classification, and control systems (e.g. robotics). Because of the high clock speeds available with the present PICs, these applications suitably can be extended to systems with faster dynamics. For example, signal classification can be performed on RF signals up to the Nyquist limit of ½ the clock frequency of the present PICs. With current foundry specifications of 30 GHz bandwidth for modulators and photodetectors, this translates to applying classification tasks to RF signals up to 15 GHz. Another example is in control systems, where systems that have dynamics at sub-nanosecond time scales can be addressed by the present PICs.

While preferred embodiments of the invention are described herein, it will be apparent to one skilled in the art that various changes and modifications may be made. For example, it should be apparent that the photonic integrated circuits and multi-mode waveguides provided herein suitably may be used to perform any suitable type of computing operation, and are not limited to use in reservoir computing. The appended claims are intended to cover all such changes and modifications that fall within the true spirit and scope of the invention.

What is claimed:

1. A method for performing an operation, the method comprising:
   receiving, by different physical locations of a multi-mode waveguide, an input signal and a plurality of coefficients imposed on laser light;
   generating, by the multi-mode waveguide, a speckle pattern based on the different physical locations, the input signal, and the plurality of coefficients; and
   adjusting at least one of the coefficients based on the speckle pattern.

2. The method of claim 1, wherein the input signal is imposed onto the laser light by an input optical modulator, and wherein the plurality of coefficients respectively are imposed onto the laser light by neuronal optical modulators.

3. The method of claim 2, wherein the input optical modulator and the neuronal optical modulators are coupled to the multi-mode waveguide via respective waveguides.

4. The method of claim 2, wherein adjusting at least one of the coefficients based on the speckle pattern comprises generating one or more electrical signals based on a received portion of the speckle pattern.

5. The method of claim 4, wherein:
   an array of photodetectors respectively coupled to the neuronal optical modulators generates the one or more electrical signals based on the received portion of the speckle pattern, and
   the coefficient imposed on the laser light by the neuronal optical modulators is adjusted based on the one or more electrical signals.

6. The method of claim 5, wherein the photodetectors receive the speckle pattern via respective waveguides.

7. The method of claim 5, further comprising generating an output signal based collectively on the one or more electrical signals.

8. The method of claim 7, wherein adjusting the at least one of the coefficients comprises adjusting a gain of at least one of the one or more electrical signals based on a comparison of the output signal to the input signal to the output signal.

9. The method of claim 8, wherein the input signal is time-varying, and wherein the output signal is predictive of the input signal.

10. The method of claim 4, wherein the neuronal optical modulators respond nonlinearly to the one or more electrical signals.

11. The method of claim 1, wherein the laser light is generated by a continuous-wave, single wavelength laser.

12. A circuit for performing an operation, the circuit comprising:
   a multi-mode waveguide configured to receive, at different physical locations, an input signal and a plurality of coefficients imposed on laser light;
   the multi-mode waveguide configured to generate a speckle pattern based on the different physical locations, the input signal, and the plurality of coefficients; and
   circuitry configured to adjust at least one of the coefficients based on the speckle pattern.

13. The circuit of claim 12, further comprising:
   an input optical modulator configured to impose the input signal onto the laser light; and
   wherein the circuitry comprises neuronal optical modulators respectively configured to impose the plurality of coefficients onto the laser light.

14. The circuit of claim 13, further comprising respective waveguides coupling the input optical modulator and the neuronal optical to the multi-mode waveguide.

15. The circuit of claim 13, wherein the circuitry is configured to generate one or more electrical signals based on a received portion of the speckle pattern and to adjust the at least one of the coefficients based on the speckle pattern based on the one or more electrical signals.

16. The circuit of claim 15, wherein the circuitry comprises an array of photodetectors coupled to one of the neuronal optical modulators and configured to generate the one or more electrical signals based on the received portion of the speckle pattern,
   wherein the coefficient imposed on the laser light by that neuronal optical modulator is adjusted based on the one or more electrical signals.

17. The circuit of claim 15, wherein the neuronal optical modulators are configured to respond nonlinearly to the one or more electrical signals.

18. The circuit of claim 15, further comprising respective waveguides coupling the photodetectors to the multi-mode waveguide so as to receive the speckle pattern.

19. The circuit of claim 18, wherein the circuitry is configured to generate an output signal based collectively on the one or more electrical signals.

20. The circuit of claim 19, wherein the circuitry further is configured to adjust the at least one of the coefficients by adjusting a gain of at least one of the one or more electrical signals based on a comparison of the output signal to the input signal to the output signal.

21. The circuit of claim 20, wherein the input signal is time-varying, and wherein the output signal is predictive of the input signal.

22. The circuit of claim 12, wherein the laser light is generated by a continuous-wave, single wavelength laser.

* * * * *